US009441165B2

(12) United States Patent
Arai

(10) Patent No.: US 9,441,165 B2
(45) Date of Patent: Sep. 13, 2016

(54) TEMPERATURE CONTROL SYSTEM, HYDROCARBON SYNTHESIS REACTION APPARATUS, HYDROCARBON SYNTHESIS REACTION SYSTEM, AND TEMPERATURE CONTROL PROCESS

(75) Inventor: Shinya Arai, Shizuoka (JP)

(73) Assignees: Japan Oil, Gas and Metals National Corporation, Tokyo (JP); INPEX CORPORATION, Tokyo (JP); JX Nippon Oil & Energy Corporation, Tokyo (JP); Japan Petroleum Exploration Co., Ltd., Tokyo (JP); COSMO OIL CO., LTD., Tokyo (JP); NIPPON STEEL & SUMIKIN ENGINEERING CO., LTD., Tokyo (JP)

( * ) Notice: Subject to any disclaimer, the term of this patent is extended or adjusted under 35 U.S.C. 154(b) by 428 days.

(21) Appl. No.: 14/007,069

(22) PCT Filed: Mar. 15, 2012

(86) PCT No.: PCT/JP2012/056753
§ 371 (c)(1),
(2), (4) Date: Sep. 24, 2013

(87) PCT Pub. No.: WO2012/132942
PCT Pub. Date: Oct. 4, 2012

(65) Prior Publication Data
US 2014/0014089 A1    Jan. 16, 2014

(30) Foreign Application Priority Data
Mar. 30, 2011  (JP) ................................. 2011-074247

(51) Int. Cl.
*B01J 8/00* (2006.01)
*B01J 19/00* (2006.01)
(Continued)

(52) U.S. Cl.
CPC .................. *C10G 3/60* (2013.01); *B01J 8/001* (2013.01); *B01J 19/0013* (2013.01); *C10G 2/33* (2013.01);
(Continued)

(58) Field of Classification Search
CPC ............ B01J 8/00; B01J 8/001; B01J 19/00; B01J 19/0006; B01J 19/0013; B01J 19/24; B01J 2219/00049–2219/00058; B01J 2219/00063; B01J 2219/00065; B01J 2219/00074; B01J 2219/00076; B01J 2219/00083; B01J 2219/00162; B01J 2219/00191–2219/00195; B01J 2219/002; B01J 2219/00222; B01J 2219/00227; B01J 2219/00238; B01J 2219/24; C10G 2/00; C10G 2/30; C10G 2/31; C10G 2/33; C10G 2/34; C10G 10/00; C10G 10/60; C10G 3/00; C10G 3/60; F22B 1/00; F22B 1/006; F22B 1/18; F22B 1/1836
See application file for complete search history.

(56) References Cited

U.S. PATENT DOCUMENTS

| 4,258,006 A | 3/1981 | Flockenhaus et al. |
| 6,864,293 B2 * | 3/2005 | Steynberg .............. B01J 8/1836 518/719 |

(Continued)

FOREIGN PATENT DOCUMENTS

| AU | 4182478 B | * 8/1979 |
| JP | S54-115303 A | 9/1979 |
| JP | S55-24190 A | 2/1980 |

OTHER PUBLICATIONS

Office Action issued Dec. 4, 2014 in GC Application No. GC 2012-20897.

(Continued)

*Primary Examiner* — Natasha Young
(74) *Attorney, Agent, or Firm* — Panitch Schwarze Belisario & Nadel LLP

(57) ABSTRACT

The temperature control system is provided with a lower heat removing unit which is disposed at the bottom of a reactor inside which an exothermic reaction takes place and through which a liquid coolant is flowed, and an upper heat removing unit which is disposed in the reactor further above from the lower heat removing unit and through which the liquid coolant is flowed, recovering reaction heat inside the reactor and controlling a temperature inside the reactor. The lower heat removing unit is supplied with the liquid coolant which is adjusted for temperature by a first temperature adjustment unit, and the upper heat removing unit is supplied with the liquid coolant which is adjusted for temperature by a second temperature adjustment unit different from the first temperature adjustment unit.

12 Claims, 7 Drawing Sheets

(51) Int. Cl.
    *B01J 19/24*    (2006.01)
    *C10G 2/00*    (2006.01)
    *C10G 3/00*    (2006.01)
    *F22B 1/18*    (2006.01)
    *F01K 13/00*    (2006.01)
    *F22B 1/00*    (2006.01)
    *F28D 21/00*    (2006.01)

(52) U.S. Cl.
    CPC ............... *C10G 2/34* (2013.01); *F01K 13/00* (2013.01); *F22B 1/1838* (2013.01); *B01J 2219/002* (2013.01); *B01J 2219/00063* (2013.01); *B01J 2219/00065* (2013.01); *B01J 2219/00083* (2013.01); *B01J 2219/00162* (2013.01); *B01J 2219/00238* (2013.01); *F28D 2021/0077* (2013.01); *Y02P 30/20* (2015.11)

(56) References Cited

U.S. PATENT DOCUMENTS

2003/0125395 A1    7/2003   Steynberg
2004/0235969 A1   11/2004   Espinoza et al.
2011/0042619 A1*   2/2011   Morita .................. C01B 3/384
                                                              252/373

OTHER PUBLICATIONS

Extended European Search Report issued Dec. 8, 2014 in EP Application No. 12765930.8.
Int'l Search Report issued Jun. 12, 2012 in Int'l Application No. PCT/JP2012/056753.

* cited by examiner

TEMPERATURE CONTROL SYSTEM, HYDROCARBON SYNTHESIS REACTION APPARATUS, HYDROCARBON SYNTHESIS REACTION SYSTEM, AND TEMPERATURE CONTROL PROCESS

CROSS-REFERENCE TO RELATED APPLICATION

This application is a Section 371 of International Application No. PCT/JP2012/056753, filed Mar. 15, 2012, which was published in the Japanese language on Oct. 4, 2012 under International Publication No. WO 2012/132942 A1, and the disclosure of which is incorporated herein by reference.

BACKGROUND OF THE INVENTION

1. Field of the Invention

The present invention relates to a temperature control system, a hydrocarbon synthesis reaction apparatus, a hydrocarbon synthesis reaction system, and a temperature control process.

Priority is claimed on Japanese Patent Application No. 2011-074247 filed on Mar. 30, 2011, the content of which is incorporated herein by reference.

2. Description of Related Art

In recent years, as a process for synthesizing liquid fuels from natural gas, the GTL (Gas To Liquids: liquid fuels synthesis) technique has been developed. This GTL technique includes the steps of reforming a natural gas to produce a synthesis gas containing carbon monoxide gas (CO) and hydrogen gas ($H_2$) as main components, synthesizing hydrocarbons using this synthesis gas as a feedstock gas and using a catalyst via the Fischer-Tropsch synthesis reaction (hereinafter also referred to as the "FT synthesis reaction"), and then hydrogenating and fractionating these hydrocarbons to produce liquid fuel products such as naphtha (raw gasoline), kerosene, gas oil and wax and the like.

As a hydrocarbon synthesis reaction apparatus used in the GTL technique, for example, a constitution shown in the Patent Document 1 given below is known. In this type of hydrocarbon synthesis reaction apparatus, in general, hydrocarbons are synthesized by subjecting carbon monoxide gas and hydrogen gas within a synthesis gas inside a reactor to the FT synthesis reaction. Inside the reactor, there is accommodated a slurry prepared by suspending solid catalyst particles (such as a cobalt catalyst or the like) in a liquid medium (for example, liquid hydrocarbons or the like).

In this hydrocarbon synthesis reaction apparatus, the synthesis gas is charged from a bottom of the reactor, thereafter, rising inside the reactor, while in contact with the slurry inside the reactor to synthesize hydrocarbon compounds. Since the synthesis gas is supplied from the bottom side of the reactor in this manner, the carbon monoxide gas and the hydrogen gas will easily undergo the FT synthesis reaction at the bottom of the reactor.

CITATION LIST

Patent Document

Patent Document 1: U.S. Patent Application Publication No. 2004/0235969

SUMMARY OF THE INVENTION

Problem to be Solved

Here, the FT synthesis reaction is an exothermic reaction. When carbon monoxide gas and hydrogen gas are subjected to the FT synthesis reaction at the bottom side of the reactor, a temperature will rise at the bottom side of the reactor. Thereby, the FT synthesis reaction is further facilitated at the bottom side of the reactor and, as a result, there is a fear that the FT synthesis reaction inside the reactor may concentrate at the bottom side of the reactor. In this case, production of hydrocarbon compounds may be reduced or the temperature may be extremely high at the bottom side of the reactor. As described above, since the temperature inside the reactor may be extremely high locally, the reactor is required to have high heat resistance, which will restrict temperature conditions in design of the reactor. This has been a problem.

The present invention has been made in view of the above situation, an object of which is to provide a temperature control system capable of controlling a temperature inside a reactor with high accuracy.

Means for Solving the Problem

The temperature control system of the present invention is a temperature control system for controlling a temperature inside a reactor in which an exothermic reaction takes place by recovering reaction heat in the reactor. The temperature control system is provided with a lower heat removing unit which is disposed at the bottom of the reactor and through which a liquid coolant is flowed, and an upper heat removing unit which is disposed in the reactor further above from the lower heat removing unit and through which the liquid coolant is flowed. The lower heat removing unit is supplied with the liquid coolant which is adjusted for temperature by a first temperature adjustment unit, and the upper heat removing unit is supplied with the liquid coolant which is adjusted for temperature by a second temperature adjustment unit different from the first temperature adjustment unit.

According to the present invention, the lower heat removing unit is supplied with a liquid coolant which is adjusted for temperature by the first temperature adjustment unit, and the upper heat removing unit is supplied with a liquid coolant, which is adjusted for temperature by the second temperature adjustment unit. Therefore, a liquid coolant different in temperature can be supplied to the lower heat removing unit and the upper heat removing unit. It is, thereby, possible to make a recovery quantity of reaction heat by the lower heat removing unit different from a recovery quantity of reaction heat by the upper heat removing unit.

Therefore, when a temperature at the bottom side of the reactor is going to rise locally, the liquid coolant supplied to the lower heat removing unit is decreased in temperature by the first temperature adjustment unit, by which the recovery quantity of reaction heat can be increased by the lower heat removing unit. It is, thereby, possible to suppress the rise in the temperature at the bottom side of the reactor.

Further, at this time, as described above, the recovery quantity of reaction heat by the lower heat removing unit can be made different from that of the reaction heat by the upper heat removing unit. It is, therefore, possible to suppress an excessively increased recovery quantity of reaction heat by the upper heat removing unit in association with an increased recovery quantity of reaction heat by the lower heat removing unit. Thereby, the reaction heat is recovered appropriately at a part located further above from the lower heat removing unit in the reactor, with excessive recovery of reaction heat being suppressed.

According to the temperature control system of the present invention, the temperature rise at the bottom side of the reactor can be suppressed and the reaction heat can be recovered appropriately at a part located further above from the lower heat removing unit in the reactor, with excessive recovery of reaction heat being suppressed. It is, therefore, possible to control the temperature inside the reactor with high accuracy.

Further, as described above, such a working effect that the temperature inside the reactor is controlled with high accuracy can be attained by supplying a liquid coolant different in temperature to the lower heat removing unit and the upper heat removing unit. Therefore, for example, there can be eliminated a necessity for adjusting a flow rate of the liquid coolant or the like flowing in each of the lower heat removing unit and the upper heat removing unit. In addition, the above working effect can be attained simply and reliably.

The temperature control system of the present invention may be further provided with a reaction heat temperature determination unit which determines the temperature inside the bottom of the reactor. The first temperature adjustment unit is controlled on the basis of a determination result of the reaction heat temperature determination unit.

According to the temperature control system of the present invention, the first temperature adjustment unit is controlled on the basis of the determination result of the reaction heat temperature determination unit. Thus, even if reaction heat at the bottom of the reactor changes in quantity, the liquid coolant supplied to a lower heat transfer unit can be adjusted for temperature so as to follow the change. Thereby, it is possible to reliably attain the above working effect.

In the temperature control system of the present invention, the first temperature adjustment unit may be provided with a coolant drum in which a liquid coolant is accommodated in a gas-liquid equilibrium state, and a pressure control unit which controls a pressure inside the coolant drum. The pressure control unit controls the pressure inside the coolant drum on the basis of deviation of an actual temperature inside the bottom of the reactor determined by the reaction heat temperature determination unit from a temperature set value inside the bottom of the reactor, thereby controlling the temperature of the liquid coolant inside the coolant drum.

In this case, since the liquid coolant is accommodated inside the coolant drum in a gas-liquid equilibrium state, the pressure inside the coolant drum corresponds to the temperature of the liquid coolant substantially in a one-to-one relationship. The pressure control unit controls the pressure inside the coolant drum by utilizing this relationship, thereby directly controlling a temperature of the liquid coolant supplied from the coolant drum to the lower heat removing unit and controlling a recovery quantity of reaction heat by the lower heat removing unit.

That is, in the temperature control system, first, on the basis of the deviation of an actual temperature inside the bottom of the reactor from a temperature set value, the pressure control unit controls a pressure inside the coolant drum. Then, depending on a correlation with a gas-liquid equilibrium state inside the coolant drum, the liquid coolant inside the coolant drum will change in temperature. Since the liquid coolant is supplied to the lower heat removing unit, a heat quantity recovered by the lower heat removing unit will change depending on a change in temperature of the liquid coolant.

According to the temperature control system of the present invention, the pressure control unit controls a pressure inside the coolant drum on the basis of deviation of an actual temperature inside the bottom of the reactor from a temperature set value. Thereby, the liquid coolant supplied to the lower heat removing unit is allowed to change in temperature, thus making it possible to adjust a heat quantity recovered by the lower heat removing unit. Therefore, where the actual temperature inside the bottom of the reactor is higher than the temperature set value, the pressure inside the coolant drum is controlled so as to be greater in heat quantity recovered by the lower heat removing unit. In addition, where the actual temperature is lower than the temperature set value, the pressure inside the coolant drum is controlled so as to be smaller in heat quantity recovered by the lower heat removing unit. Thereby, the temperature inside the bottom of the reactor can be controlled, with the target to the temperature set value.

Further, the pressure control unit controls a pressure of the coolant drum which corresponds to a temperature of the liquid coolant supplied to the lower heat removing unit in a one-to-one relationship, by which it is possible to directly control the temperature of the liquid coolant supplied from the coolant drum to the lower heat removing unit. Therefore, as compared with a method in which the liquid coolant which has been controlled for temperature externally is supplied to the coolant drum, thereby controlling a temperature of the liquid coolant inside the coolant drum, the temperature inside the bottom of the reactor can be controlled quickly. It is, thereby, possible to reliably attain the above-described working effect.

As described above, in the method in which the liquid coolant which has been controlled for temperature externally is supplied to the coolant drum, thereby controlling the temperature of the liquid coolant inside the coolant drum, the liquid coolant supplied externally and the liquid coolant inside the coolant drum are less likely to be uniform in temperature. Thus, there is a fear that the reactor may not be controlled for temperature with high accuracy.

In the temperature control system of the present invention, the coolant drum may be provided with a coolant feeding unit which feeds a liquid coolant thereinto. In addition, the coolant feeding unit may be disposed inside a gas phase portion of the coolant drum.

According to the temperature control system of the present invention, the coolant feeding unit is disposed inside the gas phase portion of the coolant drum. Therefore, even if a liquid coolant lower in temperature than the interior temperature of the coolant drum is fed from the coolant feeding unit, heat is transferred between the liquid coolant and steam inside the coolant drum, by which the liquid coolant is equalized in temperature with the steam and stored at a liquid phase portion inside the coolant drum. Thus, no difference in temperature is found between the gas phase portion and the liquid phase portion inside the coolant drum. That is, heat is transferred efficiently at the gas phase portion between the liquid coolant and the steam inside the coolant drum. Therefore, even if the liquid coolant fed from the coolant feeding unit is not externally pre-heated, no difference in temperature is found between the gas phase portion and the liquid phase portion inside the coolant drum. A pressure and a temperature inside the coolant drum can be reliably kept so as to be correlated in a gas-liquid equilibrium state.

In the temperature control system of the present invention, a dispersing unit which disperses a liquid coolant to the gas phase portion may be formed at the coolant feeding unit.

According to the temperature control system of the present invention, the dispersing unit which disperses a liquid coolant to the gas phase portion is formed at the coolant feeding unit. Therefore, the liquid coolant fed from the coolant feeding unit is increased in surface area, thus making it possible to conduct heat transfer more smoothly between the steam and the liquid coolant inside the coolant drum. Thereby, a pressure and a temperature inside the coolant drum can be kept more reliably so as to be correlated in a gas-liquid equilibrium state.

In the temperature control system of the present invention, the coolant feeding unit may be formed in a tubular shape, and the dispersing unit may be constituted with a through hole formed on the coolant feeding unit.

According to the temperature control system of the present invention, since the dispersing unit is constituted with the through hole formed on the coolant feeding unit, the liquid coolant can be reliably dispersed.

The temperature control system of the present invention may be provided with a return line which returns a mixed phase fluid containing the steam generated at the lower heat removing unit and a liquid coolant to the coolant drum, a steam outlet line which discharges the steam inside the coolant drum to outside a system, and a feed line which supplies feed water composed of the liquid coolant to the return line in a quantity of feed water matching a quantity of steam discharged outside the system.

According to the temperature control system of the present invention, a quantity of feed water matching a flow rate of steam discharged outside the system is converged into the return line and directly mixed with a flow rate of steam saturated in temperature inside the return line, by which the feed water can be heated and evaporated prior to being supplied to the coolant drum. Thereby, a gas-liquid temperature inside the coolant drum can be constantly maintained at a saturated temperature.

Further, as compared with a case where the feed water is directly supplied to the coolant drum, a complicated structure and establishment of large facilities are avoided, thus making it possible to control uniformly a temperature inside the coolant drum.

The temperature control system of the present invention may be further provided with a control device which decides the quantity of feed water on the basis of a product of a difference between a relatively high temperature inside the coolant drum and a relatively low temperature of the feed water with a quantity of reaction heat inside the reactor, and a water-supply adjustment device which sets the quantity of feed water to be supplied from the feed line to the return line depending on the quantity of feed water decided by the control device.

According to the temperature control system of the present invention, accurate computation can be made by the control device so that the quantity of feed water is equal to a flow rate of steam which is discharged outside the system and accurate restrictions can be placed so that the quantity of feed water will not exceed the flow rate of steam. It is, thereby, possible to reliably prevent hammering resulting from complete condensation at a converging portion.

In the temperature control system of the present invention, the quantity of feed water decided by the control device may be computed by the following formula.

$$WL3 = Q/\{Cp \times (t1-t3) + r\},$$

wherein $WL3$ is a quantity of feed water, $Q$ is a quantity of reaction heat inside the bottom of the reactor, $Cp$ is a specific heat of liquid coolant, $t1$ is a temperature inside the coolant drum or inside the bottom of the reactor, $t3$ is a temperature of feed water, and $r$ is an evaporative latent heat of liquid coolant.

According to the temperature control system of the present invention, the above formula can be used to make an accurate computation so that the quantity of feed water is equal to or lower than the flow rate of steam discharged outside the system. Thus, restrictions can be placed so that the quantity of feed water will not exceed the flow rate of steam.

In the temperature control system of the present invention, at the converging portion of the return line with the feed line, the feed line may be connected to the return line at an acute angle along a direction at which a mixed phase fluid moves forward inside the return line.

According to the temperature control system of the present invention, when feed water in the feed line is converged with a mixed phase fluid of steam with a liquid coolant in the return line, the feed water can be supplied along a direction at which the mixed phase fluid flows. Thereby, it is possible to prevent hammering caused by impact from collision of the feed water against the mixed phase fluid when they are made to converge.

In the temperature control system of the present invention, the feed line may be provided with a seal portion which prevents reverse flow of steam. Thereby, it is possible to prevent hammering caused by reverse flow of steam inside the return line into the feed line to result in condensation, where the feed water is supplied in a smaller quantity.

In the temperature control system of the present invention, a spray nozzle which sprays feed water into the return line may be installed on the feed line at the converging portion of the return line with the feed line. As a result, when the feed water is supplied to the return line from the feed line at the converging portion, the spray nozzle is used to spray the feed water and uniformly disperse the water, which is then brought into contact with steam of the mixed phase fluid. Thereby, it is possible to suppress abrupt condensation of steam due to localization of the feed water and prevent hammering.

The hydrocarbon synthesis reaction apparatus of the present invention is a hydrocarbon synthesis reaction apparatus in which a synthesis gas containing hydrogen gas and carbon monoxide gas as main components is brought into contact with a slurry prepared by suspending catalyst particles inside a liquid medium to synthesize hydrocarbon compounds. The hydrocarbon synthesis reaction apparatus is provided with a reactor which accommodates the slurry and to which the synthesis gas is supplied and the temperature control system. Therefore, it is possible to suppress a local temperature rise at the bottom side of the reactor.

The hydrocarbon synthesis reaction system of the present invention is provided with the hydrocarbon synthesis reaction apparatus, a synthesis gas production unit which reforms a hydrocarbon feedstock to produce the synthesis gas and then supplies the synthesis gas to the reactor, and an upgrading unit which produces liquid fuels from the hydrocarbon compounds. Thereby, it is possible to suppress the local temperature rise at the bottom side of the reactor.

The temperature control process of the present invention is a temperature control process in which a temperature control system composed of a lower heat removing unit which is disposed at the bottom of a reactor in which an exothermic reaction takes place inside and through which a liquid coolant is flowed and an upper heat removing unit which is disposed further above from the lower heat removing unit in the reactor and through which the liquid coolant is flowed is used to recover reaction heat inside the reactor, thereby controlling the temperature inside the reactor. The liquid coolant which is supplied to the lower heat removing unit is made lower in temperature than the liquid coolant which is supplied to the upper heat removing unit.

In the present invention, the liquid coolant supplied to the lower heat removing unit is made lower in temperature than the liquid coolant supplied to the upper heat removing unit, or the liquid coolant is increased in flow rate by itself to recover a greater heat quantity. Therefore, it is possible to suppress a temperature rise at the bottom side of the reactor and also to recover the reaction heat appropriately at a part located further above from the lower heat removing unit in the reactor, with excessive recovery being suppressed.

According to the temperature control process of the present invention, it is possible to suppress a temperature rise at the bottom side of the reactor and also recover the reaction heat appropriately at a part located further above from the lower heat removing unit in the reactor, with excessive recovery being suppressed. Thus, it is possible to control the temperature inside the reactor with high accuracy.

Further, as described above, a liquid coolant different in temperature is supplied to each of the lower heat removing unit and the upper heat removing unit, thus making it possible to attain the working effect that a temperature inside the reactor is controlled with high accuracy. Therefore, for example, there is eliminated the necessity for adjusting a flow rate of the liquid coolant which is flowed through the lower heat removing unit and the upper heat removing unit or the like. In addition, the above working effect can be attained simply and reliably.

Advantageous Effects of the Invention

According to the present invention, it is possible to control a temperature inside the reactor with high accuracy.

DETAILED DESCRIPTION OF THE INVENTION

Hereinafter, a description will be given of one embodiment of the liquid fuel synthesizing system in one embodiment of the present invention with reference to the drawings.
(Liquid Fuel Synthesizing System)

Figure 1:
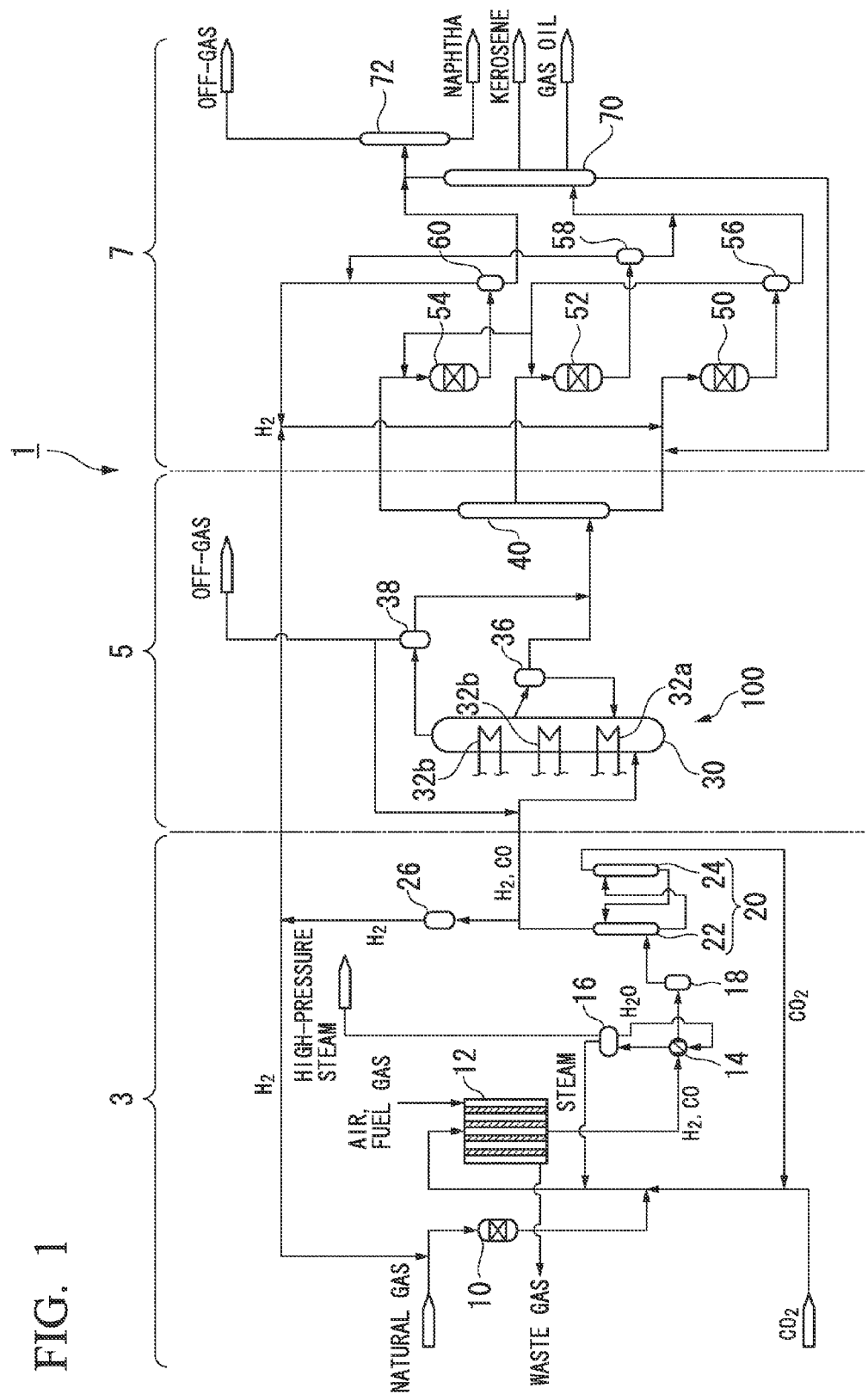
FIG. 1 is a schematic diagram which shows an entire constitution of a liquid fuel synthesizing system of one embodiment of the present invention.

As illustrated in FIG. 1, the liquid fuel synthesizing system (hydrocarbon synthesis reaction system) 1 is a plant facility which carries out a GTL process that converts a hydrocarbon feedstock such as a natural gas into liquid fuels. This liquid fuel synthesizing system 1 includes a synthesis gas production unit 3, an FT synthesis unit (hydrocarbon synthesis reaction apparatus) 5, and an upgrading unit 7. The synthesis gas production unit 3 reforms a natural gas that functions as a hydrocarbon feedstock to produce a synthesis gas containing carbon monoxide gas and hydrogen gas. The FT synthesizing unit 5 produces liquid hydrocarbon compounds from the produced synthesis gas via the FT synthesis reaction. The upgrading unit 7 hydrotreats the liquid hydrocarbon compounds synthesized by the FT synthesis reaction to produce liquid fuels and other products (such as naphtha, kerosene, gas oil, and wax). Structural elements of each of these units are described below.

First is a description of the synthesis gas production unit 3.

The synthesis gas production unit 3 is, for example, composed mainly of a desulfurization reactor 10, a reformer 12, a waste heat boiler 14, gas-liquid separators 16 and 18, a $CO_2$ removal unit 20, and a hydrogen separator 26. The desulfurization reactor 10 is composed of a hydrodesulfurizer and the like, and removes sulfur components from the natural gas that functions as the feedstock. The reformer 12 reforms the natural gas supplied from the desulfurization reactor 10 to produce a synthesis gas containing carbon monoxide gas (CO) and hydrogen gas ($H_2$) as main components. The waste heat boiler 14 recovers waste heat from the synthesis gas produced in the reformer 12 to generate a high-pressure steam. The gas-liquid separator 16 separates the water that has been heated by heat exchange with the synthesis gas in the waste heat boiler 14 into a gas (high-pressure steam) and a liquid. The gas-liquid separator 18 removes a condensed component from the synthesis gas that has been cooled in the waste heat boiler 14, and supplies a gas component to the $CO_2$ removal unit 20. The $CO_2$ removal unit 20 has an absorption tower (second absorption tower) 22 and a regeneration tower 24. The absorption tower 22 uses an absorbent to absorb carbon dioxide gas contained in the synthesis gas supplied from the gas-liquid separator 18. The regeneration tower 24 strips the carbon dioxide gas absorbed by the absorbent, thereby regenerating the absorbent. The hydrogen separator 26 separates a portion of the hydrogen gas contained in the synthesis gas from which the carbon dioxide gas has already been separated by the CO$_2$ removal unit 20. In some cases, the above CO$_2$ removal unit 20 may not need to be provided.

In the reformer 12, for example, by utilizing a steam and carbon dioxide gas reforming method represented by the chemical reaction formulas (1) and (2) shown below, the natural gas is reformed by carbon dioxide and steam, and a high-temperature synthesis gas is produced which includes carbon monoxide gas and hydrogen gas as main components. However, the reforming method employed in the reformer 12 is not limited to this steam and carbon dioxide gas reforming method. For example, a steam reforming method, a partial oxidation reforming method (POX) using oxygen, an autothermal reforming method (ATR) that is a combination of a partial oxidation reforming method and a steam reforming method, or a carbon dioxide gas reforming method and so on, may also be used.

Chemical Formula 1:

$$CH_4 + H_2O \rightarrow CO + 3H_2 \quad (1)$$

$$CH_4 + CO_2 \rightarrow 2CO + 2H_2 \quad (2)$$

The hydrogen separator 26 is provided on a branch line that branches off a main line which connects the CO$_2$ removal unit 20 or the gas-liquid separator 18 with a slurry bubble column reactor 30. This hydrogen separator 26 may be composed of, for example, a hydrogen PSA (Pressure Swing Adsorption) apparatus, that performs adsorption and desorption of hydrogen by utilizing a pressure difference. This hydrogen PSA apparatus has adsorbents (such as a zeolitic adsorbent, activated carbon, alumina or silica gel) packed inside a plurality of adsorption towers (not shown in the drawing) that are arranged in parallel. By sequentially repeating each of the steps of hydrogen pressurization, adsorption, desorption (depressurization) and purging within each of these adsorption towers, the hydrogen PSA apparatus can continuously supply a high-purity hydrogen gas (of approximately 99.999% purity, for example) that has been separated from the synthesis gas.

The hydrogen gas separating method employed in the hydrogen separator 26 is not limited to the type of pressure swing adsorption method utilized by the above hydrogen PSA apparatus, and for example, a hydrogen storing alloy adsorption method, a membrane separation method, or a combination thereof may also be used.

The hydrogen storing alloy method is a technique for separating hydrogen gas using, for example, a hydrogen storing alloy (such as TiFe, LaNi$_5$, TiFe$_{(0.7\ to\ 0.9)}$Mn$_{(0.3\ to\ 0.1)}$, or TiMn$_{1.5}$) that exhibits hydrogen adsorption and strip properties upon cooling and heating respectively. In the hydrogen storing alloy method, for example, hydrogen adsorption by cooling the hydrogen storing alloy, and hydrogen strip by heating the hydrogen storing alloy may be repeated alternately within a plurality of adsorption towers containing the hydrogen storing alloy. In this manner, hydrogen gas contained in the synthesis gas can be separated and recovered.

The membrane separation method is a technique that uses a membrane composed of a polymer material such as an aromatic polyimide to separate hydrogen gas, which exhibits superior membrane permeability, from a mixed gas. Since the membrane separation method does not require a phase change of the separation target materials in order to achieve separation, less energy is required for the separation operation, meaning the running costs are low. Further, because the structure of a membrane separation device is simple and compact, the facility costs are low and the surface area required to install the facility is small. Moreover, there is no driving device in a separation membrane and the stable operating range is broad, which offers another advantage in that maintenance is comparatively easy.

Next is a description of the FT synthesis unit 5.

The FT synthesis unit 5 mainly includes, for example, the reactor 30, a separator 36, a gas-liquid separator 38, and a first fractionator 40. The reactor 30 uses the FT synthesis reaction to synthesize liquid hydrocarbon compounds from the synthesis gas produced by the above-described synthesis gas production unit 3, that is, from carbon monoxide gas and hydrogen gas. The separator 36 is connected to the middle section of the reactor 30, and separates the catalyst and the liquid hydrocarbon compounds. The gas-liquid separator 38 is connected to the top of the reactor 30 and cools any unreacted synthesis gas and gaseous hydrocarbon compounds. The first fractionator 40 fractionally distills the liquid hydrocarbon compounds that have been supplied from the reactor 30 via the separator 36 and the gas-liquid separator 38 into a series of fractions.

The reactor 30 is an example of a reactor that synthesizes liquid hydrocarbon compounds from a synthesis gas, and functions as an FT synthesis reactor that synthesizes liquid hydrocarbon compounds from the synthesis gas by the FT synthesis reaction. The reactor 30 is formed, for example, from a bubble column slurry bed type reactor in which a slurry composed mainly of catalyst particles and an oil medium (liquid medium, liquid hydrocarbons) is stored inside a column type vessel. This reactor 30 synthesizes gaseous or liquid hydrocarbon compounds from the synthesis gas by the FT synthesis reaction. Specifically, in the reactor 30, a synthesis gas that represents the feedstock gas is supplied as gas bubbles from a dispersion plate positioned in the bottom of the reactor 30, and these gas bubbles pass through the slurry, which has been formed by suspending catalyst particles in the oil medium. In this suspended state, the hydrogen gas and carbon monoxide gas contained in the synthesis gas react with each other to synthesize hydrocarbon compounds, as shown in the following chemical reaction formula (3).

Chemical Formula 2:

$$2nH_2 + nCO \rightarrow (-CH_2-)_n + nH_2O \quad (3)$$

In addition, because the FT synthesis reaction is an exothermic reaction, the reactor 30 is a heat exchange type-reactor in which heat transfer tubes (a lower heat removing unit and an upper heat removing unit) 32$a$, 32$b$ constituting the temperature control system 80 are internally disposed. The reactor 30 is supplied, for example, with water (BFW: Boiler Feed Water) as a coolant, so that the reaction heat of the FT synthesis reaction can be recovered in the form of a middle-pressure steam by heat exchange between the slurry and the water.

Next is a description of the upgrading unit 7. The upgrading unit 7 includes, for example, a wax fraction hydrocracking reactor 50, a middle distillate hydrotreating reactor 52, a naphtha fraction hydrotreating reactor 54, gas-liquid separators 56, 58 and 60, a second fractionator 70, and a naphtha stabilizer 72. The wax fraction hydrocracking reactor 50 is connected to the bottom of the first fractionator 40. The middle distillate hydrotreating reactor 52 is connected to a middle section of the first fractionator 40. The naphtha fraction hydrotreating reactor 54 is connected to the top of the first fractionator 40. The gas-liquid separators 56, 58 and 60 are provided so as to correspond to the hydrogenation reactors 50, 52 and 54 respectively. The second fractionator 70 fractionally distills the liquid hydrocarbon compounds supplied from the gas-liquid separators 56 and 58. The naphtha stabilizer 72 rectifies the liquid hydrocarbon compounds within the naphtha fraction supplied from the gas-liquid separator 60 and fractionally distilled in the second fractionator 70. As a result, the naphtha stabilizer 72 discharges butane and components lighter than butane as an off-gas, and recovers components having a carbon number of five or greater as a naphtha product.

Next is a description of a process for synthesizing liquid fuels from a natural gas (GTL process) using the liquid fuel synthesizing system 1 having the structure described above.

A natural gas (the main component of which is $CH_4$) is supplied as a hydrocarbon feedstock to the liquid fuel synthesizing system 1 from an external natural gas supply source (not shown in the drawing), such as a natural gas field or a natural gas plant. The above synthesis gas production unit 3 reforms the natural gas to produce a synthesis gas (a mixed gas containing carbon monoxide gas and hydrogen gas as main components).

Specifically, first, the natural gas described above is introduced to the desulfurization reactor 10 together with the hydrogen gas separated by the hydrogen separator 26. In the desulfurization reactor 10, sulfur components included in the natural gas are converted into hydrogen sulfide by the introduced hydrogen gas and the hydrodesulfurization catalyst. Further, in the desulfurization reactor 10, the produced hydrogen sulfide is absorbed and removed by a desulfurizing agent such as ZnO. By desulfurizing the natural gas in advance in this manner, reduction in the activity of the catalysts used in the reformer 12, the reactor 30 and so on, due to sulfur can be prevented.

The natural gas (which may also include carbon dioxide) that has been desulfurized in this manner is supplied to the reformer 12 after mixing with carbon dioxide gas ($CO_2$) supplied from a carbon dioxide supply source (not shown in the drawing) and the steam generated in the waste heat boiler 14. In the reformer 12, for example, the natural gas is reformed by the carbon dioxide gas and the steam via the aforementioned steam-carbon dioxide reforming process, thereby producing a high-temperature synthesis gas including carbon monoxide gas and hydrogen gas as main components. At this time, for example, a fuel gas and air for a burner installed in the reformer 12 are supplied to the reformer 12, and the combustion heat from the fuel gas in the burner is used to provide the necessary reaction heat for the above steam-carbon dioxide gas reforming reaction, which is an endothermic reaction.

The high-temperature synthesis gas (for example, 900° C., 2.0 MPaG) produced in the reformer 12 in this manner is supplied to the waste heat boiler 14, and is cooled (for example, to 400° C.) by heat exchange with the water flowing through the waste heat boiler 14, thereby recovering the waste heat from the synthesis gas.

At this time, the water heated by the synthesis gas in the waste heat boiler 14 is supplied to the gas-liquid separator 16. In the gas-liquid separator 16, the water that has been heated by the synthesis gas is separated into a high-pressure steam (for example, 3.4 to 10.0 MPaG) and water. The separated high-pressure steam is supplied to the reformer 12 or other external devices, whereas the separated water is returned to the waste heat boiler 14.

Meanwhile, the synthesis gas that has been cooled within the waste heat boiler 14 is supplied to either the absorption tower 22 of the $CO_2$ removal unit 20 or the reactor 30, after a condensed liquid fraction has been separated and removed from the synthesis gas in the gas-liquid separator 18. In the absorption tower 22, carbon dioxide gas contained in the synthesis gas is absorbed by an absorbent stored in the absorption tower 22, thereby removing the carbon dioxide gas from the synthesis gas. The absorbent that has absorbed the carbon dioxide gas within the absorption tower 22 is discharged from the absorption tower 22 and introduced into the regeneration tower 24. This absorbent that has been introduced into the regeneration tower 24 is then heated, for example, with steam, and subjected to a stripping treatment to strip the carbon dioxide gas. The striped carbon dioxide gas is discharged from the regeneration tower 24 and introduced into the reformer 12, where it can be reused for the above reforming reaction.

The synthesis gas produced in the synthesis gas production unit 3 in this manner is supplied to the reactor 30 of the above FT synthesis unit 5. At this time, the composition ratio of the synthesis gas supplied to the reactor 30 is adjusted to a composition ratio suitable for the FT synthesis reaction (for example, $H_2:CO=2:1$ (molar ratio)). In addition, the synthesis gas supplied to the reactor 30 is pressurized to a pressure suitable for the FT synthesis reaction (for example, approximately 3.6 MPaG) by a compressor (not shown in the drawing) provided in the line connecting the $CO_2$ removal unit 20 with the reactor 30.

Furthermore, a portion of the synthesis gas that has undergone separation of the carbon dioxide gas by the above $CO_2$ removal unit 20 is also supplied to the hydrogen separator 26. In the hydrogen separator 26, the hydrogen gas contained in the synthesis gas is separated by adsorption and desorption utilizing a pressure difference (hydrogen PSA) as described above. The separated hydrogen gas is supplied continuously from a gas holder or the like (not shown in the drawing) via a compressor (not shown in the drawing) to the various hydrogen-utilizing reactors (for example, the desulfurization reactor 10, the wax fraction hydrocracking reactor 50, the middle distillate hydrotreating reactor 52, the naphtha fraction hydrotreating reactor 54 and so on) within the liquid fuel synthesizing system 1 that perform predetermined reactions using hydrogen.

Next, the FT synthesis unit 5 synthesizes liquid hydrocarbon compounds by the FT synthesis reaction from the synthesis gas produced in the above synthesis gas production unit 3.

Specifically, the synthesis gas that has undergone separation of the carbon dioxide gas by the above $CO_2$ removal unit 20 is introduced into the reactor 30, and flows through the slurry including the catalyst contained in the reactor 30. During this time within the reactor 30, the carbon monoxide and hydrogen gas contained in the synthesis gas react with each other by the aforementioned FT synthesis reaction, and hydrocarbon compounds are produced. Moreover, during this FT synthesis reaction, the reaction heat of the FT synthesis reaction is recovered by the water (liquid coolant) flowing (circulating) through the heat transfer tubes 32a, 32b of the reactor 30, and the water that has been heated by this reaction heat is vaporized into steam.

The liquid hydrocarbon compounds synthesized in the reactor 30 in this manner are discharged from the middle section of the reactor 30 as a slurry that includes catalyst particles, and this slurry is introduced into the separator 36. In the separator 36, the introduced slurry is separated into the catalyst (the solid fraction) and a liquid fraction containing the liquid hydrocarbon compounds. A portion of the separated catalyst is returned to the reactor 30, whereas the liquid fraction is introduced into the first fractionator 40. Gaseous by-products, including unreacted synthesis gas from the FT synthesis reaction and gaseous hydrocarbon compounds produced in the FT synthesis reaction, are discharged from the top of the reactor 30. The gaseous by-products discharged from the reactor 30 are introduced into the gas-liquid separator 38. In the gas-liquid separator 38, the introduced gaseous by-products are cooled and separated into condensed liquid hydrocarbon compounds and a gas fraction. The separated liquid hydrocarbon compounds are discharged from the gas-liquid separator 38 and introduced into the first fractionator 40. The separated gas fraction is discharged from the gas-liquid separator 38, with a portion of the gas fraction being reintroduced into the reactor 30. In the reactor 30, the unreacted synthesis gases ($CO$ and $H_2$) contained in this reintroduced gas fraction are reused for the FT synthesis reaction. Further, the remaining portion of the gas fraction discharged from the gas-liquid separator 38 may be used as an off-gas fuel, or fuels equivalent to LPG (Liquefied Petroleum Gas) may be recovered from the gas fraction.

In the first fractionator 40, the liquid hydrocarbon compounds (with various carbon numbers) supplied from the reactor 30 via the separator 36 and the gas-liquid separator 38 in the manner described above are fractionally distilled into a naphtha fraction (with a boiling point that is lower than approximately 150° C.), a middle distillate (with a boiling point of approximately 150 to 350° C.) and a wax fraction (with a boiling point that exceeds approximately 350° C.). The liquid hydrocarbon compounds of the wax fraction (mainly $C_{21}$ or higher) discharged from the bottom of the first fractionator 40 are introduced into the wax fraction hydrocracking reactor 50. The liquid hydrocarbon compounds of the middle distillate equivalent to kerosene and gas oil (mainly $C_{11}$ to $C_{20}$) discharged from the middle section of the first fractionator 40 are introduced into the middle distillate hydrotreating reactor 52. The liquid hydrocarbon compounds of the naphtha fraction (mainly $C_5$ to $C_{10}$) discharged from the top of the first fractionator 40 are introduced into the naphtha fraction hydrotreating reactor 54.

The wax fraction hydrocracking reactor 50 hydrocracks the liquid hydrocarbon compounds of the high-carbon number wax fraction (hydrocarbons of approximately $C_{21}$ or higher) discharged from the bottom of the first fractionator 40 by using the hydrogen gas supplied from the above-described hydrogen separator 26 to reduce the carbon number to 20 or less. In this hydrocracking reaction, C—C bonds of hydrocarbon compounds with a large carbon number are cleaved. This process converts the hydrocarbon compounds with a large carbon number to hydrocarbon compounds with a small carbon number. Further, in the wax fraction hydrocracking reactor 50, the reaction for hydroisomerizing linear saturated hydrocarbon compounds (normal paraffins) to produce branched saturated hydrocarbon compounds (isoparaffins) proceeds in parallel with the hydrocracking reaction. This improves the low-temperature fluidity of the wax fraction hydrocracked product, which is a required property for a fuel oil base stock. Moreover, in the wax fraction hydrocracking reactor 50, a hydrodeoxygenation reaction of oxygen-containing compounds such as alcohols, and a hydrogenation reaction of olefins, both of which may be contained in the wax fraction that functions as the feedstock, also proceed during the hydrocracking process. The products including the liquid hydrocarbon compounds hydrocracked and discharged from the wax fraction hydrocracking reactor 50 are introduced into the gas-liquid separator 56, and separated into a gas and a liquid. The separated liquid hydrocarbon compounds are introduced into the second fractionator 70, and the separated gas fraction (which includes hydrogen gas) is introduced into the middle distillate hydrotreating reactor 52 and the naphtha fraction hydrotreating reactor 54.

In the middle distillate hydrotreating reactor 52, the liquid hydrocarbon compounds of the middle distillate equivalent to kerosene and gas oil, which have a mid-range carbon number (of approximately $C_{11}$ to $C_{20}$) and have been discharged from the middle section of the first fractionator 40, are hydrotreated. In the middle distillate hydrotreating reactor 52, hydrogen gas supplied from the hydrogen separator 26 via the wax fraction hydrocracking reactor 50 is used for the hydrotreating. In this hydrotreating reaction, olefins contained in the above liquid hydrocarbon compounds are hydrogenated to produce saturated hydrocarbon compounds, and oxygen-containing compounds such as alcohols contained in the liquid hydrocarbon compounds are hydrodeoxygenated and converted into saturated hydrocarbon compounds and water. Moreover, in this hydrotreating reaction, a hydroisomerization reaction that isomerizes linear saturated hydrocarbon compounds (normal paraffins) and converts them into branched saturated hydrocarbon compounds (isoparaffins) also proceeds, thereby improving the low-temperature fluidity of the product oil, which is a required property for a fuel oil. The product including the hydrotreated liquid hydrocarbon compounds is separated into a gas and a liquid in the gas-liquid separator 58.

The separated liquid hydrocarbon compounds are introduced into the second fractionator 70, and the separated gas fraction (which includes hydrogen gas) is reused for the above hydrogenation reaction.

In the naphtha fraction hydrotreating reactor 54, the liquid hydrocarbon compounds of the naphtha fraction, which have a low carbon number (approximately $C_{10}$ or less) and have been discharged from the top of the first fractionator 40, are hydrotreated. In the naphtha fraction hydrotreating reactor 54, hydrogen gas supplied from the hydrogen separator 26 via the wax fraction hydrocracking reactor 50 is used for the hydrotreating. As a result, a product including the hydrotreated liquid hydrocarbon compounds is separated into a gas and a liquid in the gas-liquid separator 60. The separated liquid hydrocarbon compounds are introduced into the naphtha stabilizer 72, and the separated gas fraction (which includes hydrogen gas) is reused for the above hydrogenation reaction. In the naphtha fraction hydrotreating reaction, the hydrogenation of olefins and hydrodeoxygenation of oxygen-containing compounds such as alcohols mainly proceed.

In the second fractionator 70, the liquid hydrocarbon compounds supplied from the wax fraction hydrocracking reactor 50 and the middle distillate hydrotreating reactor 52 in the manner described above are fractionally distilled into hydrocarbon compounds with a carbon number of $C_{10}$ or less (with boiling points lower than approximately 150° C.), a kerosene fraction (with a boiling point of approximately 150 to 250° C.), a gas oil fraction (with a boiling point of approximately 250 to 350° C.) and an uncracked wax fraction (with a boiling point exceeding approximately 350° C.) from the wax fraction hydrocracking reactor 50. The uncracked wax fraction is obtained from the bottom of the second fractionator 70, and this is recycled to a position upstream of the wax fraction hydrocracking reactor 50.

Kerosene and gas oil are discharged from the middle section of the second fractionator 70. Meanwhile, gaseous hydrocarbon compounds of $C_{10}$ or less are discharged from the top of the second fractionator 70 and introduced into the naphtha stabilizer 72.

In the naphtha stabilizer 72, the hydrocarbon compounds of $C_{10}$ or less, which have been supplied from the naphtha fraction hydrotreating reactor 54 and fractionally distilled in the second fractionator 70, are distilled, and naphtha ($C_5$ to $C_{10}$) is obtained as a product. Accordingly, high-purity naphtha is discharged from the bottom of the naphtha stabilizer 72. Meanwhile, an off-gas including mainly hydrocarbon compounds with a predetermined carbon number or less ($C_4$ or less), which is not a targeted product, is discharged from the top of the naphtha stabilizer 72. This off-gas is used as a fuel gas, or alternatively, a fuel equivalent to LPG may be recovered from the off-gas.

Next, a description will be given of the temperature control system 100 which recovers reaction heat inside the reactor 30 to control a temperature inside the reactor 30. This temperature control system 100 is, as described above, installed on the reactor 30 for accommodating a slurry, thereby recovering in the reactor 30 the reaction heat of the FT synthesis reaction (exothermic reaction) caused by bringing the synthesis gas supplied from the bottom 30a thereof into contact with the slurry.

FIRST EMBODIMENT

Figure 2:
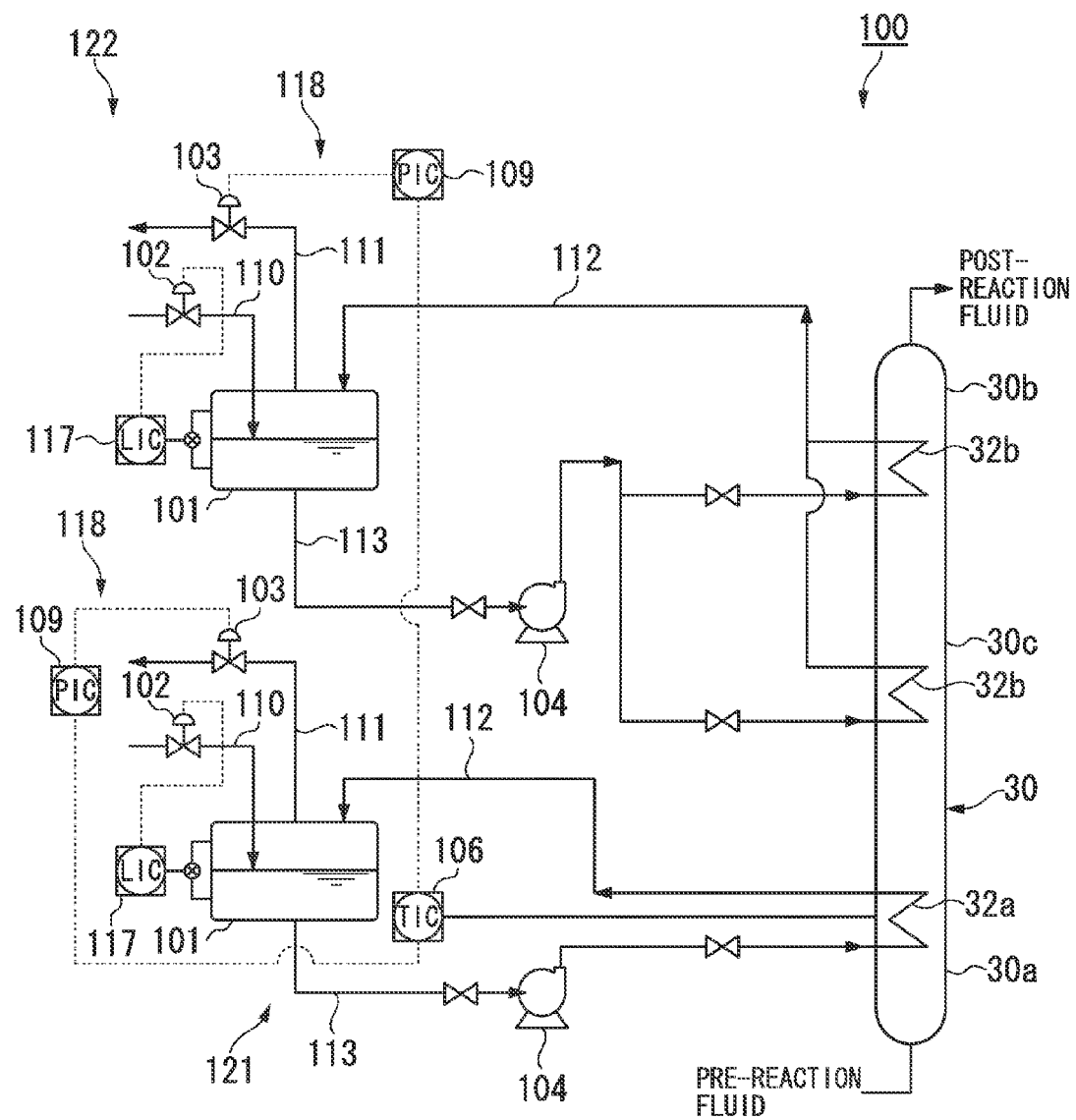
FIG. 2 is a schematic flow chart of a temperature control system which constitutes the liquid fuel synthesizing system shown in FIG. 1.

As shown in FIG. 2, the temperature control system 100 is provided with the heat transfer tubes 32a, 32b. As the heat transfer tubes 32a, 32b, there are provided a lower heat transfer tube (lower heat removing unit) 32a which is disposed inside a bottom 30a of the reactor 30 and an upper heat transfer tube (upper heat removing unit) 32b which is disposed inside a part located further above from the lower heat transfer tube 32a in the reactor 30. In the illustrated example, two upper heat transfer tubes 32b are arranged, with an interval kept vertically. These two upper heat transfer tubes 32b are arranged inside a top 30b of the reactor 30 and also inside a middle section 30c between the top 30b and the bottom 30a of the reactor 30.

Then, in the present embodiment, the lower heat transfer tube 32a is supplied with water which has been adjusted for temperature by a first temperature adjustment unit 121. And, the upper heat transfer tube 32b is supplied with water which has been adjusted for temperature by a second temperature adjustment unit 122 different from the first temperature adjustment unit 121.

The first temperature adjustment unit 121 is provided with a coolant drum 101 which accommodates water in a gas-liquid equilibrium state, and a pressure control unit 118 which controls a pressure inside the coolant drum 101.

The coolant drum 101 and the lower heat transfer tube 32a are connected by a delivery line 113 provided with a flow rate adjustable pump 104. Water inside the coolant drum 101 is sent from the bottom of the coolant drum 101 to the lower heat transfer tube 32a by the pump 104.

A mixed phase fluid of steam resulting from evaporation of some water in the lower heat transfer tube 32a and water is returned to the coolant drum 101 through a return line 112 which connects the lower heat transfer tube 32a with the coolant drum 101.

The pressure control unit 118 is provided with a steam outlet line 111 which discharges steam inside the coolant drum 101, a pressure adjusting valve 103 which is installed on the steam outlet line 111, and a pressure setting unit 109 which controls the pressure adjusting valve 103 to set the pressure inside the coolant drum 101.

The steam which has been discharged through the steam outlet line 111 is supplied to a steam user outside a system.

A steam trap (not shown in the drawing) may be provided on the downstream side of the steam outlet line 111.

The pressure setting unit 109 controls a discharged quantity of steam inside the coolant drum 101 which has passed through the steam outlet line 111 by using the pressure adjusting valve 103, thereby setting a pressure inside the coolant drum 101. To the pressure setting unit 109, there is sent a determination result inside the bottom 30a of the reactor 30 from the reaction heat temperature determination unit 106 which determines a temperature inside the reactor 30. The pressure setting unit 109 sets a pressure inside the coolant drum 101 on the basis of the determination result.

The reaction heat temperature determination unit 106 can be constituted, for example, with a plurality of temperature sensors (not shown in the drawing) disposed apart from each other vertically in the reactor 30.

Moreover, feed water (water) is supplied through the feed line 110 in a quantity matching a quantity of steam discharged outside the system by the pressure control unit 118 through the steam outlet line 111.

Figure 3:
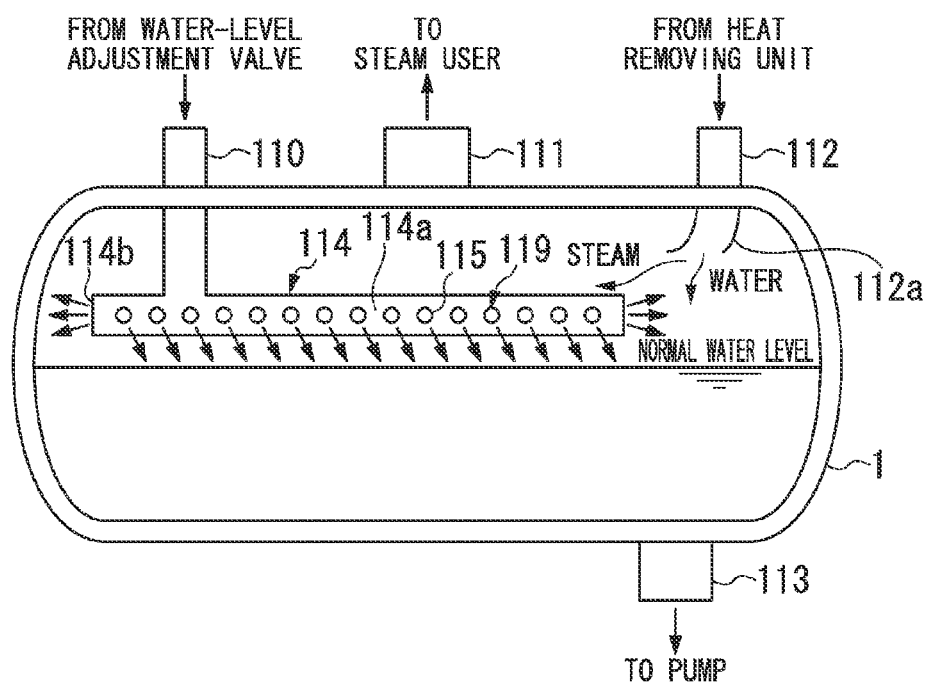
FIG. 3 is a cross sectional view of a coolant drum shown in FIG. 1.
Figure 4:
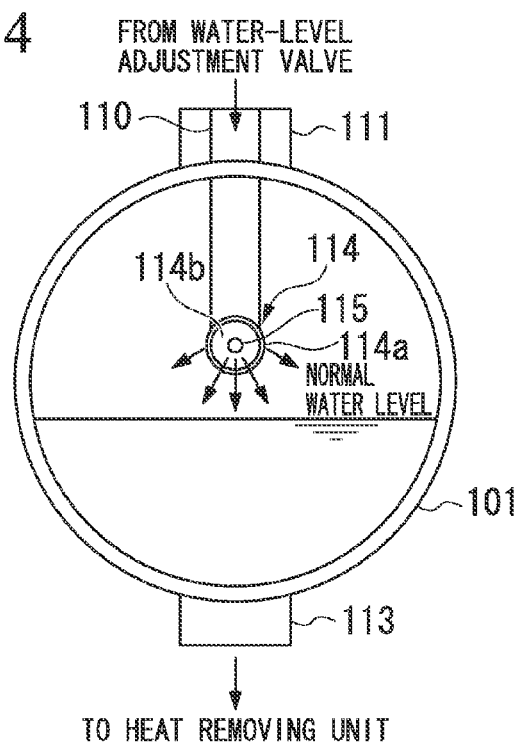
FIG. 4 is a longitudinal sectional view of the coolant drum shown in FIG. 1.

As shown in FIG. 3 and FIG. 4, a feed-water inner line (coolant feeding unit) 114 extended along the longitudinal direction of the coolant drum 101 is connected with the feed line 110. The feed-water inner line 114 is installed in a steam phase of the coolant drum 101.

One or more holes (through holes) 115 are provided on a side surface 114a of the feed-water inner line 114 along the tube axial direction, and one or more holes 115 are also provided at a line end 114b. Then, these holes 115 constitute water sprinkling units (dispersing units) 119 which sprinkle (disperse) feed water into the steam phase from the feed-water inner line 114. Each of the holes 115 may be a sprinkling nozzle.

Further, a return inner line 112a connected to the return line 112 is also installed inside the steam phase of the coolant drum 101. A mixed phase fluid of steam resulting from evaporation of some water in the lower heat transfer tube 32a and water is supplied into the coolant drum 101 from the return inner line 112a. The return inner line 112a is located further above from the feed-water inner line 114 and also arranged at a position away from a perpendicular upper side of the feed-water inner line 114. Then, the return inner line 112a is curved toward the feed-water inner line 114 side, by which steam flowed inside the return inner line 112a is supplied to the feed-water inner line 114.

As shown in FIG. 2, a quantity of feed water supplied from the feed line 110 is adjusted by a level adjusting valve 102 on the basis of a determination result of a level determination unit 117 which determines a water level (liquid level) inside the coolant drum 101.

Here, the second temperature adjustment unit 122 is constituted substantially in a similar manner as the first temperature adjustment unit 121. In the second temperature adjustment unit 122, the same reference numerals are given to the same parts as structural elements of the first temperature adjustment unit 121, with the description thereof being omitted. A description will only be given of a different part.

The delivery line 113 of the second temperature adjustment unit 122 is branched to the downstream side from the pump 104 and connected to each of the upper heat transfer tubes 32b at each branched site.

Further, the return line 112 of the second temperature adjustment unit 122 is extended from each of the both upper heat transfer tubes 32b, converged on its way and, thereafter, connected to the coolant drum 101.

Then, to the pressure setting unit 109 of the second temperature adjustment unit 122, there is sent each of determination results inside the top 30*b* and the middle section 30*c* of the reactor 30 from the reaction heat temperature determination unit 106. The pressure setting unit 109 sets a pressure inside the coolant drum 101 on the basis of the determination results.

A description will be given of one example of operating the above-constituted temperature control system 100.

In the temperature control system 100, the first temperature adjustment unit 121 adjusts a temperature of water so as to be lower than a temperature of water adjusted by the second temperature adjustment unit 122. Thereby, a quantity of reaction heat recovered by the lower heat transfer tube 32*a* can be made greater than that of reaction heat recovered by the upper heat transfer tube 32*b*. At this time, a ratio of the quantity of reaction heat recovered by the lower heat transfer tube 32*a* to that of reaction heat recovered by the upper heat transfer tube 32*b* can be made approximately 3:1, or the like, for example.

Further, in the present embodiment, the first temperature adjustment unit 121 adjusts a temperature of water so as to be lower than a temperature of water adjusted by the second temperature adjustment unit 122, by which an actual temperature inside the bottom 30*a* of the reactor 30 is made lower than an actual temperature inside each of the middle section 30*c* and the top 30*b* located further above from the bottom 30*a* in the reactor 30. At this time, for example, the actual temperature inside the bottom 30*a* of the reactor 30 can be made, for example, approximately 200° C., and the actual temperature inside each of the middle section 30*c* and the top 30*b* of the reactor 30 can be made, for example, approximately 230° C.

Here, the actual temperature inside each of the bottom 30*a*, the middle section 30*c* and the top 30*b* in the reactor 30 can be determined by the reaction heat temperature determination unit 106.

Therefore, in the present embodiment, the pressure control unit 118 of the first temperature adjustment unit 121 controls a pressure inside the coolant drum 101 on the basis of deviation of an actual temperature inside the bottom 30*a* of the reactor 30 determined by the reaction heat temperature determination unit 106 from a temperature set value inside the bottom 30*a*, thereby controlling a temperature of water inside the coolant drum 101.

That is, since a steam phase (gas phase portion) and a water phase (liquid phase portion) inside the coolant drum 101 are in a gas-liquid equilibrium state, a steam phase pressure of the coolant drum 101 is constantly correlated with a water phase temperature of the coolant drum 101. Therefore, where an actual temperature of the bottom 30*a* determined by the reaction heat temperature determination unit 106 is deviated from a temperature set value at the bottom 30*a* of the reactor 30, the pressure control unit 118 is actuated to change the steam phase pressure of the coolant drum 101.

Then, the water phase inside the coolant drum 101 is changed in temperature, thus making it possible to change a heat quantity recovered by the lower heat transfer tube 32*a* and bring a temperature at the bottom 30*a* of the reactor 30 close to a temperature set value. Where one example of a relationship between water temperature and saturated steam pressure is exemplified, a saturated steam pressure at 195° C. is approximately 14760.75 hPa, that at 170° C. is approximately 8249.20 hPa, and that at 140° C. is approximately 3706.57 hPa.

Further, regarding the second temperature adjustment unit 122 as well, on the basis of deviation of an actual temperature inside each of the middle section 30*c* and the top 30*b* of the reactor 30 determined by the reaction heat temperature determination unit 106 from a temperature set value inside each of the middle section 30*c* and the top 30*b* of the reactor 30, the pressure control unit 118 of the second temperature adjustment unit 122 controls a pressure inside the coolant drum 101, thereby controlling the temperature of water inside the coolant drum 101.

As described above, when steam is discharged through the steam outlet line 111 by the pressure control unit 118, the water level inside the coolant drum 101 is lowered, by which feed water is supplied from the feed-water inner line 114. At this time, the feed water is supplied from the feed-water inner line 114 at a position which is not submerged to result in heat exchange between the feed water low in temperature and steam in a steam phase. Thus, it is possible to avoid a situation that the feed water flows into the bottom of the coolant drum 101, while being maintained at a low temperature.

Further, the feed water is sprinkled from the holes 115 on the side surface 114*a* and the line end 114*b* of the feed-water inner line 114, thereby increasing the contact area of the feed water with steam. It is, thus, possible to improve the efficiency of heat exchange and also the efficiency of heat exchange between the feed water lower in temperature and the temperature of steam. Thereby, no difference in temperature is found between the steam phase and the water phase. Thus, a steam phase pressure inside the coolant drum 101 and a water phase temperature inside the coolant drum 101 can be kept constantly correlated based on the gas-liquid equilibrium state.

Figure 5:
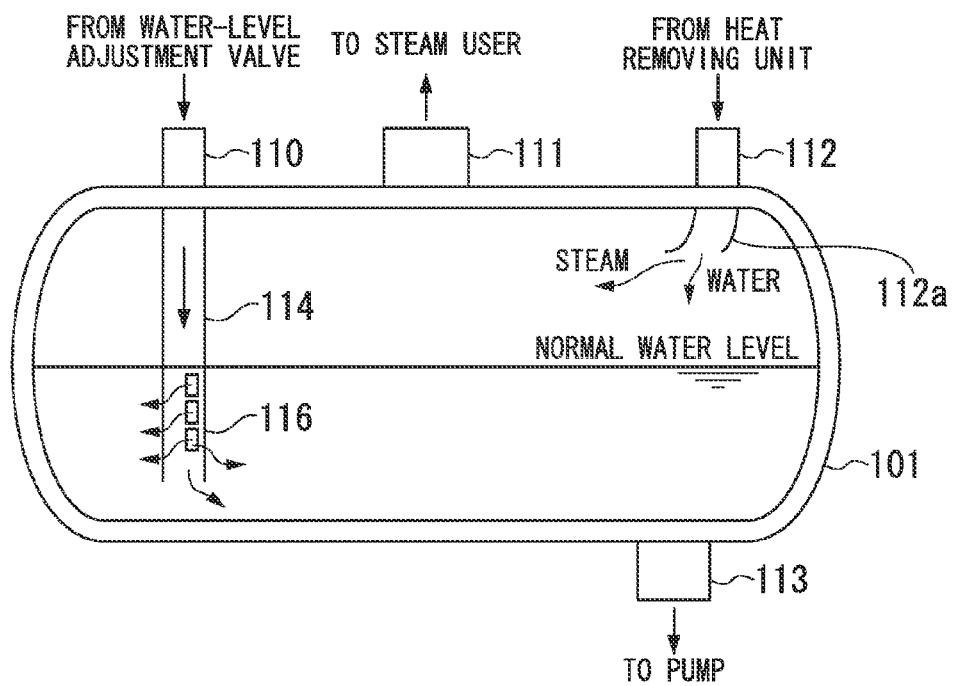
FIG. 5 is a cross sectional view of a coolant drum of one reference example of the present invention.

As shown in the reference example of FIG. 5, when the feed-water inner line 114 is submerged into the coolant drum 101, the low-temperature feed water great in specific gravity hardly flows out through the side surface open holes 116 on the feed-water inner line 114 and directly flows to the bottom of the coolant drum 101. Therefore, a difference in temperature is found between the steam phase and the water phase inside the coolant drum 101. Then, there is a fear that a correlation between the steam phase pressure of the coolant drum 101 and the water phase temperature inside the coolant drum 101 may collapse.

As so far described, according to the temperature control system 100 of the present invention, water which has been adjusted for temperature by the first temperature adjustment unit 121 is supplied to the lower heat transfer tube 32*a*, and water which has been adjusted for temperature by the second temperature adjustment unit 122 is also supplied to the upper heat transfer tube 32*b*. It is, therefore, possible to supply water different in temperature to the lower heat transfer tube 32*a* and also to the upper heat transfer tube 32*b*. Thereby, a quantity of reaction heat recovered by the lower heat transfer tube 32*a* can be made different from a quantity of reaction heat recovered by the upper heat transfer tube 32*b*.

Thus, when a temperature at the bottom 30*a* side of the reactor 30 is going to rise locally, water which is supplied to the lower heat transfer tube 32*a* is decreased in temperature by the first temperature adjustment unit 121, thus making it possible to increase a quantity of reaction heat recovered by the lower heat transfer tube 32*a*. Thus, it is possible to suppress a temperature rise at the bottom 30*a* side of the reactor 30.

Further, at this time, as described above, the quantity of reaction heat recovered by the lower heat transfer tube 32*a* can be made different from that of reaction heat recovered by the upper heat transfer tube 32*b*. Thus, it is possible to suppress an excessive increase in quantity of reaction heat recovered by the upper heat transfer tube 32*b* in association with an increase in quantity of reaction heat recovered by the lower heat transfer tube 32a. Thereby, the reaction heat can be recovered appropriately at the middle section 30c and the top 30b located further above from the lower heat transfer tube 32a in the reactor 30, with excessive recovery of the reaction heat being suppressed.

As describe so far, the temperature rise at the bottom 30a side of the reactor 30 can be suppressed and the reaction heat can also be appropriately recovered at the middle section 30c and the top 30b of the reactor 30, with excessive recovery of the reaction heat being suppressed. Thus, it is possible to control a temperature inside the reactor 30 with high accuracy.

Figure 6:
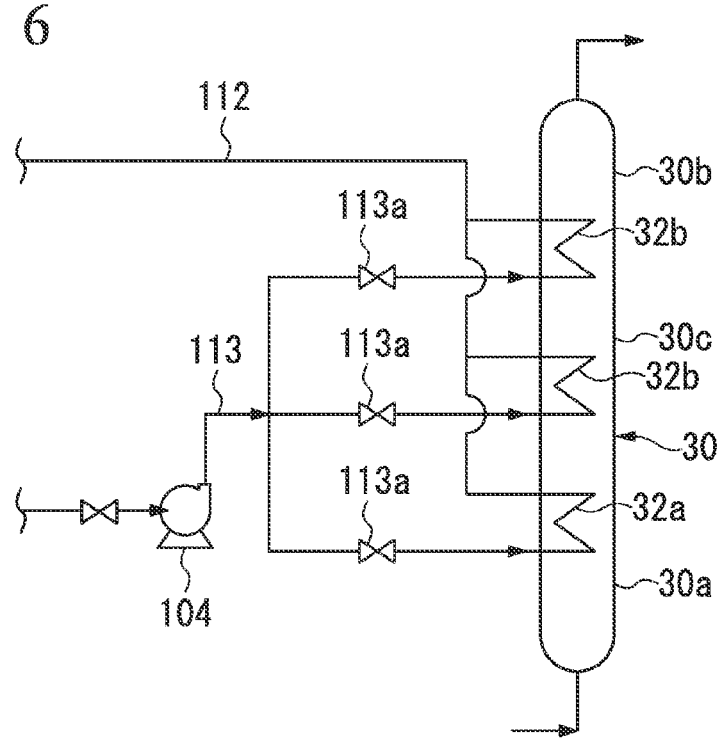
FIG. 6 is a schematic flow chart which shows a temperature control system of one reference example of the present invention.

Further, as described above, the working effect that a temperature inside the reactor 30 is controlled with high accuracy can be attained by supplying water different in temperature to the lower heat transfer tube 32a and the upper heat transfer tube 32b. Therefore, eliminated is the need for a flow-channel adjusting valve 113a installed on the delivery line 113 being adjusted to regulate a flow rate of water flowing through each of the lower heat transfer tube 32a and the upper heat transfer tube 32b, for example, as shown in the reference example of FIG. 6. Thus, the above working effect can be attained simply and reliably.

Further, the pressure control unit 118 controls a pressure inside the coolant drum 101 on the basis of deviation of an actual temperature inside the bottom 30a of the reactor 30 from a temperature set value, thus making it possible to change a temperature of water supplied to the lower heat transfer tube 32a and adjust a heat quantity recovered by the lower heat transfer tube 32a. Therefore, where the actual temperature inside the bottom 30a of the reactor 30 is higher than the temperature set value, the pressure inside the coolant drum 101 is controlled so as to increase the heat quantity recovered by the lower heat transfer tube 32a. In addition, where the actual temperature is lower than the temperature set value, the pressure inside the coolant drum 101 is controlled so as to decrease the heat quantity recovered by the lower heat transfer tube 32a. Thereby, it is possible to control the temperature inside the bottom 30a of the reactor 30, with the target to the temperature set value.

Still further, the pressure control unit 118 controls a pressure of the coolant drum 101 which corresponds to a temperature of water supplied to the lower heat transfer tube 32a in a one-to-one relationship, thus making it possible to directly control a temperature of the water supplied to the lower heat transfer tube 32a from the coolant drum 101. Therefore, as compared with a method in which water which has been controlled for temperature externally is supplied to the coolant drum 101, thereby controlling a temperature of the water inside the coolant drum 101, it is possible to control quickly a temperature inside the bottom 30a of the reactor 30. Thereby, the above working effect can be attained reliably.

As described above, in the method in which water which has been controlled for temperature externally is supplied to the coolant drum 101, thereby controlling a temperature of water inside the coolant drum 101, the water supplied externally is less likely to be uniform in temperature with the water inside the coolant drum 101. There is a fear that the reactor 30 may not be controlled for temperature with high accuracy.

Further, the feed-water inner line 114 is disposed inside a steam phase of the coolant drum 101. Thus, even if water, the temperature of which is lower than a temperature inside the coolant drum 101, is supplied from the feed-water inner line 114, heat transfer is carried out between the water and steam inside the coolant drum 101. In addition, the water is equalized in temperature to the steam and stored in a steam phase inside the coolant drum 101. Therefore, no difference in temperature is found between these steam phases inside the coolant drum 101.

As described so far, the heat is transferred efficiently between the water and the steam inside the coolant drum 101 in a steam phase. Thus, even if water supplied from the feed-water inner line 114 is not pre-heated outside the system, no difference in temperature is found between the steam phases inside the coolant drum 101. Therefore, the pressure and the temperature inside the coolant drum 101 can be reliably kept correlated in a gas-liquid equilibrium state.

Further, since the water sprinkling unit 119 for sprinkling water to the steam phase is formed on the feed-water inner line 114, water supplied from the feed-water inner line 114 is increased in surface area, by which smooth heat transfer can be carried out between the steam and the water inside the coolant drum 101. Thereby, a pressure and a temperature inside the coolant drum 101 can be more reliably kept correlated in a gas-liquid equilibrium state.

Further, since the water sprinkling unit 119 is constituted with the hole 115 formed on the feed-water inner line 114, it is possible to disperse water reliably.

SECOND EMBODIMENT

Next is a description of a temperature control system of the second embodiment of the present invention.

Here, in the second embodiment, a first temperature adjustment unit 121 and a second temperature adjustment unit 122 are different compared to those of the first embodiment. Further, in the second embodiment, as with the first embodiment, the second temperature adjustment unit 122 is substantially the same in constitution as the first temperature adjustment unit 121.

Thus, in the second embodiment, a description will be given of the first temperature adjustment unit 121, with a description of others being omitted. Further, regarding the first temperature adjustment unit 121 as well, the same reference numerals are given to the same parts as structural elements of the first embodiment, with the description thereof being omitted. A description will only be given of a different part.

Figure 7:
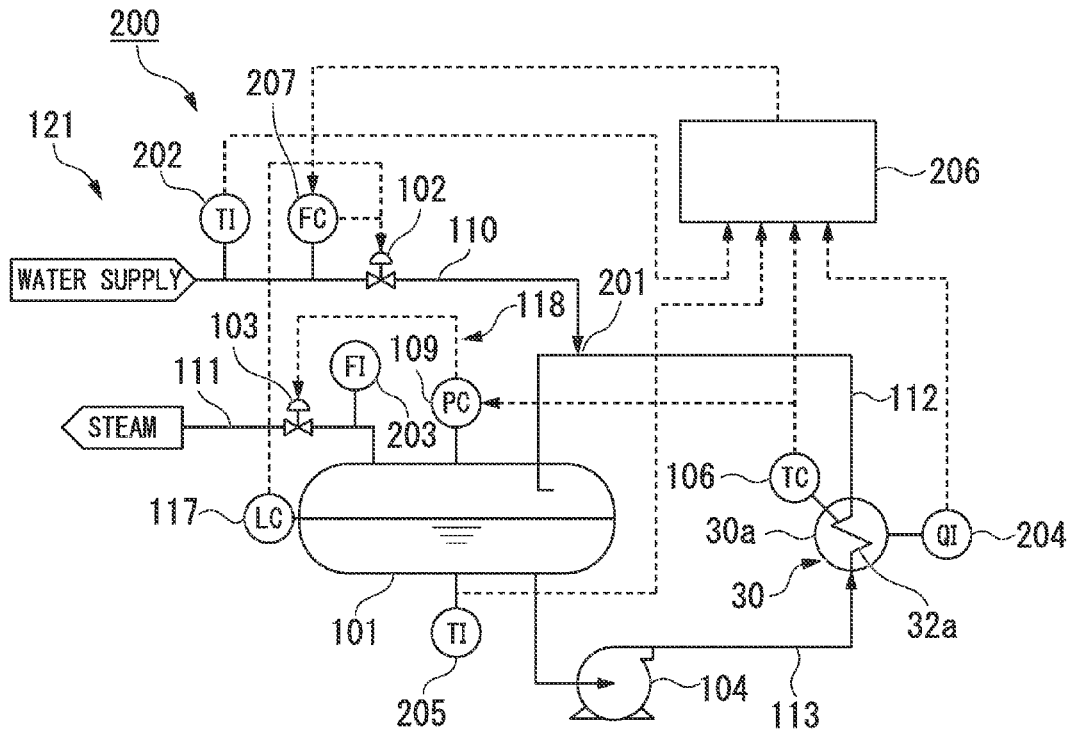
FIG. 7 is a schematic flow chart which shows a temperature control system of a second embodiment of the present invention.

In FIG. 7, for an easy understanding of the drawing, an upper heat transfer tube 32b and the second temperature adjustment unit 122 are not shown, and a reactor 30 is shown schematically.

As shown in FIG. 7, a feed line 110 is connected at a converging portion 201 on its way to a return line 112, and feed water in a quantity matching a quantity of steam discharged from a steam outlet line 111 outside a system is supplied to a coolant drum 101. Thereby, the feed water relatively low in temperature (given as a temperature t3, for example) is directly mixed with steam evaporated by the reactor 30 inside the return line 112 at a relatively high temperature (given as a temperature t1, for example, t1>t3) and heated to a saturated temperature.

Further, a quantity of steam inside the return line 112 which is downstream from the converging portion 201 is equal to or less than a quantity of steam discharged from the coolant drum 101 by the steam outlet line 111. A flow rate of the water is controlled so as to be substantially equal to a flow rate of water supplied from the coolant drum 101 through a delivery line 113 to the reactor 30.

A feed-water temperature determination unit 202 for determining a temperature of feed water is installed on the feed line 110. And, the feed water of the feed line 110 is vaporized by the return line 112 and supplied into the coolant drum 101.

Further, a steam discharge-quantity determination device 203 for determining a quantity of steam discharged outside the system is installed on the steam outlet line 111. Still further, a reaction-heat quantity determination unit 204 for determining a quantity of reaction heat Q inside the reactor 30 is installed on the reactor 30. In addition, a temperature of water phase inside the coolant drum 101 can be determined by a water phase temperature determination unit 205 installed at the bottom of the coolant drum 101. In the present embodiment, the reaction-heat quantity determination unit 204 is constituted so as to determine a quantity of reaction heat Q inside each of the bottom 30a, the top 30b and the middle section 30c of the reactor 30.

A temperature control system 200 is provided with a control device 206 which controls a quantity of feed water in such a manner that a quantity of feed water from the feed line 110 is not in excess of a quantity of steam discharged from the steam outlet line 111 outside the system. Individual values determined by the water phase temperature determination unit 205 for determining a temperature of water phase inside the coolant drum 101, the reaction heat temperature determination unit 106 of the reactor 30, the reaction-heat quantity determination unit 204, and the feed-water temperature determination unit 202 which determines the temperature of feed water inside the feed line 110 are input to the control device 206. In addition, the quantity of feed water is decided by being computed so as not to be in excess of a quantity of steam discharged from the steam outlet line 111.

Data on the computed quantity of feed water is output to a flow-rate adjustment device 207 installed on the feed line 110, and the level adjusting valve 102 is adjusted for an opening degree to control the quantity of feed water. The flow-rate adjustment device 207 and the level adjusting valve 102 constitute a water-supply adjustment device.

These provide such a control that the quantity of feed water WL3 will not exceed the flow rate of steam WV1.

Next, a description will be given of one example of a method for computing a quantity of feed water by the control device 206.

Figure 8:
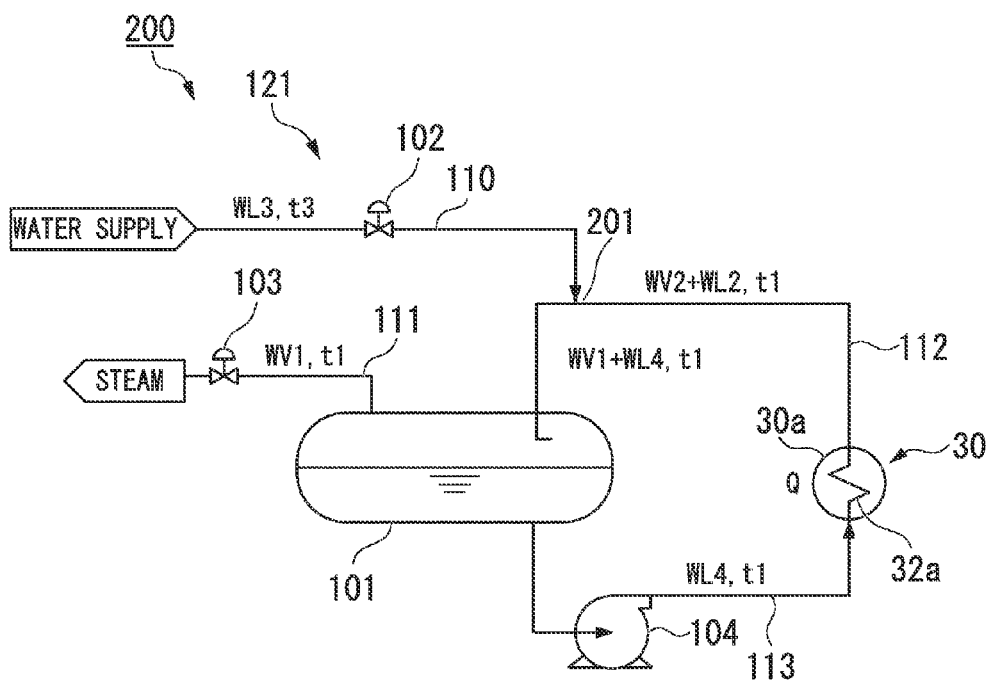
FIG. 8 is a view which describes recycle lines of water and steam in the temperature control system shown in FIG. 7 as well as the flow rate and the temperature thereof.

As shown in FIG. 8, a quantity of steam discharged by the steam outlet line 111 is given as WV1; a temperature, t1; a flow rate of water supplied through the delivery line 113 to the reactor 30, WL4; a temperature, t1; a quantity of steam discharged from the reactor 30 to the return line 112, WV2; a flow rate of water, WL2; each temperature, t1; a flow rate of water supplied from the feed line 110 to the return line 112, WL3; a temperature, t3; a quantity of steam returned from the return line 112 to the coolant drum 101 after being converged, WV1; a flow rate of water, WL4; and each temperature, t1. In addition, a flow rate of water is given as a unit of kg/h, a flow rate of steam is given as a unit of kg/h, and a temperature is given as °C.

Further, a quantity of reaction heat in the reactor 30 is given as Q (kcal/h), an evaporative latent heat of water is given as r (kcal/kg), and the specific heat of water is given as Cp (kcal/kg/°C.).

First, since a steam production quantity WV1 in the return line 112 with which the feed line 110 has been thereafter converged is equal to a quantity of feed water WL3, due to a material balance, the following formula (4) is satisfied.

$$WV1=WL3 \quad (4)$$

A description will be given of procedures for obtaining the above formula (4), which are as follows:

In FIG. 8, first, a flow rate of water WL4 at a temperature t1 supplied from the coolant drum 101 is given as a flow rate of steam WV2 at a temperature t1+ a flow rate of water WL2 through the recovery of reaction heat by the reactor 30. Therefore, when there is indicated an incoming and outgoing material balance which is changed in phase in the reactor 30, the following formula (5) is obtained.

$$WL4=WV2+WL2 \quad (5)$$

Further, the quantity of feed water WL3 is supplied from the feed line 110, by which a material balance (water supply+change in phase) at the converging portion 201 of the return line 112 with the feed line 110 is expressed by the following formula (6).

$$WV2+WL2+WL3=WV1+WL4 \quad (6)$$

The formula (5) is substituted for the formula (6), the result of which is set to give the above formula (4).

Further, the temperature of the quantity of feed water WL3 is a low temperature t3 and the other is a high temperature t1 (>t3). At the converging portion 201 of the return line 112 with the feed line 110, there is obtained such a relationship that a quantity of condensed steam is equal to a pre-heat quantity of water supply/an evaporative latent heat, and the following formula is satisfied.

$$(WV2-WV1) \times r = WL3 \times Cp \times (t1-t3) \quad (7)$$

A relationship between a quantity of reaction heat Q with a quantity of steam production WV2 in the reactor 30 is obtained in the following formula:

$$WV2=Q/r \quad (8)$$

Then, the formulae (4) and (8) are substituted for the formula (7), the result of which is set to obtain the following formula.

$$WL3=Q/\{Cp \times (t1-t3)+r\} \quad (9)$$

As described above, the quantity of feed water WL3 can be obtained by referring to the relationship between the quantity of reaction heat Q and temperatures of supplied water t1, t3.

In addition, the quantity of reaction heat Q can be obtained by referring to the reaction rate determined separately and a difference in temperature between the coolant drum 101 and the reactor 30.

The temperature control system 200 of the present embodiment is constituted as described above, and next is a description of a control process thereof.

For example, the water supply pump 104 is driven, by which a flow rate of water WL4 at a temperature t1 is supplied from the coolant drum 101 to the reactor 30. Due to the reaction heat associated with an exothermic reaction caused in the reactor 30, the flow rate of water WL4 is partially evaporated inside the lower heat transfer tube 32a into a two-phase fluid composed of a flow rate of steam WV2 at a temperature t1 and a flow rate of water WL2. The two-phase fluid (mixed phase fluid) is supplied through the return line 112.

Further, since the above-described flow rate of water WL4 is discharged with the pump 104 to the reactor 30, a water level between the steam phase and the water phase inside the coolant drum 101 is decreased. The decrease in water level is determined by the level determination unit 117. Then, feed water is adjusted for a quantity thereof on the basis of the determination result by the level adjusting valve 102 installed on the feed line 110 and then supplied.

On the other hand, the quantity of feed water WL3 at a relatively low temperature t3 decided by the control device 206 is supplied through the feed line 110 and converged with the two-phase fluid (WV2+WL2) inside the return line 112 at the converging portion 201 with the return line 112. Then, at the converging portion 201, the quantity of feed water WL3 at a temperature t3 is directly mixed with the steam WV2 at a high temperature t1 inside the return line 112 and heated to give steam at a saturated temperature t1. Further, the steam is partially condensed, by which the flow rate of water inside the return line 112 is made the same to a flow rate of water WL4 which is supplied from the coolant drum 101 to the delivery line 113.

Then, in the return line 112 downstream from the converging portion 201, the flow rate of steam WV1 at a temperature t1 and a flow rate of water WL4 are provided and discharged above the water level inside the coolant drum 101.

Here, a description will be given of a process for controlling the quantity of feed water WL3 by the control device 206.

A temperature t1 determined by the water phase temperature determination unit 205 for determining a water phase temperature inside the coolant drum 101, a temperature t1 determined by the reaction heat temperature determination unit 106 for determining a temperature of the reactor 30, a quantity of reaction heat Q determined by the reaction-heat quantity determination unit 204, and a temperature t3 of feed water determined by the feed-water temperature determination unit 202 on the feed line 110 are input to the control device 206. Then, the control device 206 computes the quantity of feed water WL3 by referring to the above formula (9).

A computed value of the quantity of feed water WL3 is output to the flow-rate adjustment device 207 to actuate the level adjusting valve 102, by which the flow rate of feed water WL3 is supplied to the feed line 110, converged into the return line 112 at the converging portion 201 and discharged into the coolant drum 101.

Then, the water level between the steam phase and the water phase is adjusted to a set level inside the coolant drum 101. A pressure of the steam phase and a temperature of the water phase are constantly kept so as to be correlated based on the gas-liquid equilibrium state.

Further, the flow rate of steam WV1 is discharged outside a system through the steam outlet line 111 from the coolant drum 101 and also the quantity of feed water WL3 is converged with a two-phase fluid composed of steam and water at the converging portion 201 on the return line 112 and supplied into the coolant drum 101. Further, the flow rate of steam WV1 and the quantity of feed water WL3 are controlled equally by the control device 206, or the quantity of feed water WL3 is controlled so as to be lower than the flow rate of steam WV1. Therefore, the water level inside the coolant drum 101 is adjusted so as to be constant.

As described above, according to the temperature control system 200 of the present embodiment, the quantity of feed water WL3 at a relatively low temperature t3 which is equal in temperature to the flow rate of steam WV1 discharged outside a system through the steam outlet line 111 is converged into the return line 112 from the feed line 110 and can be directly mixed with the flow rate of steam WV2 at a saturated temperature t1 inside the return line 112. Thus, the quantity of feed water can be instantly heated and evaporated. Therefore, a gas liquid temperature inside the coolant drum 101 can be constantly maintained at a saturated temperature.

Further, the control device 206 is used to compute in such a manner that the quantity of feed water WL3 is equal to the flow rate of steam WV1 discharged outside the system. The quantity of feed water can be accurately restricted so that the quantity of feed water WL3 will not exceed the flow rate of steam WV1, thus making it possible to prevent hammering resulting from complete condensation at the converging portion 201.

Still further, since facilities are not complicated in structure or enlarged in size, it is possible to control uniformly a temperature inside the coolant drum 101.

MODIFIED EXAMPLES OF THE SECOND EMBODIMENT

Next, a description will be given of a constitution which prevents hammering when the feed line 110 is converged with the return line 112 at the converging portion 201 in the temperature control system 200 with reference to modified examples shown in FIG. 9 to FIG. 11.

FIRST MODIFIED EXAMPLE

Figure 9:
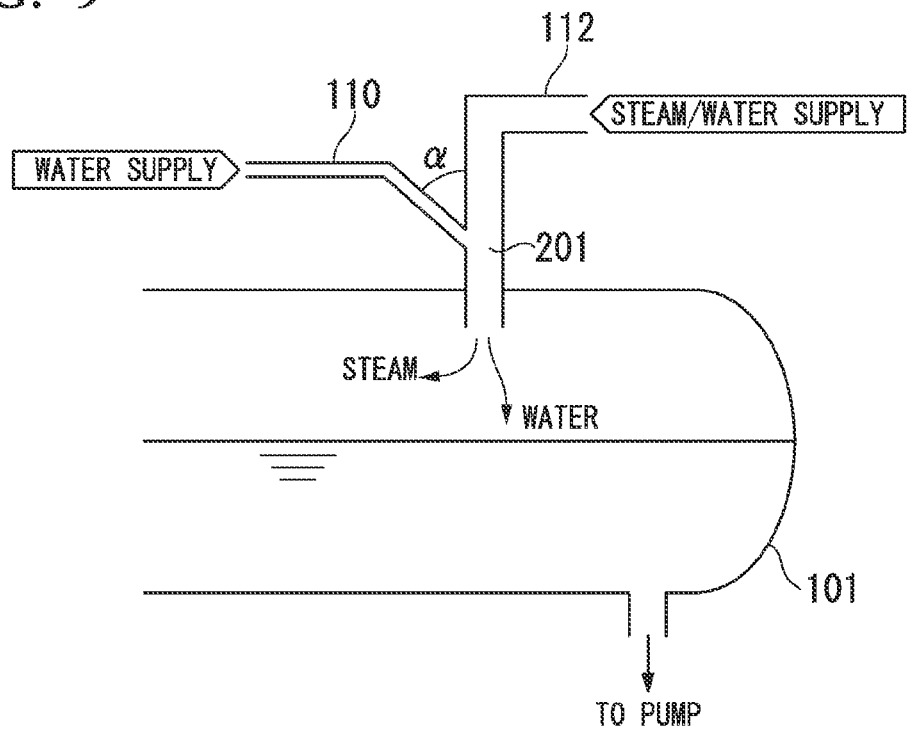
FIG. 9 is a view which describes a converging portion of a return line with a feed line of a first modified example in the temperature control system shown in FIG. 7.

FIG. 9 shows a constitution of a converging portion 201 as a first modified example. In FIG. 9, a feed line 110 is coupled and converged with a return line 112 so as to give an acute angle α with respect to a direction at which a two-phase fluid of the return line 112 flows. Thereby, the feed water is smoothly converged with the two-phase fluid composed of steam and water flowing through the return line 112 and subjected to evaporation. Thus, hammering is not caused.

SECOND MODIFIED EXAMPLE

Figure 10:
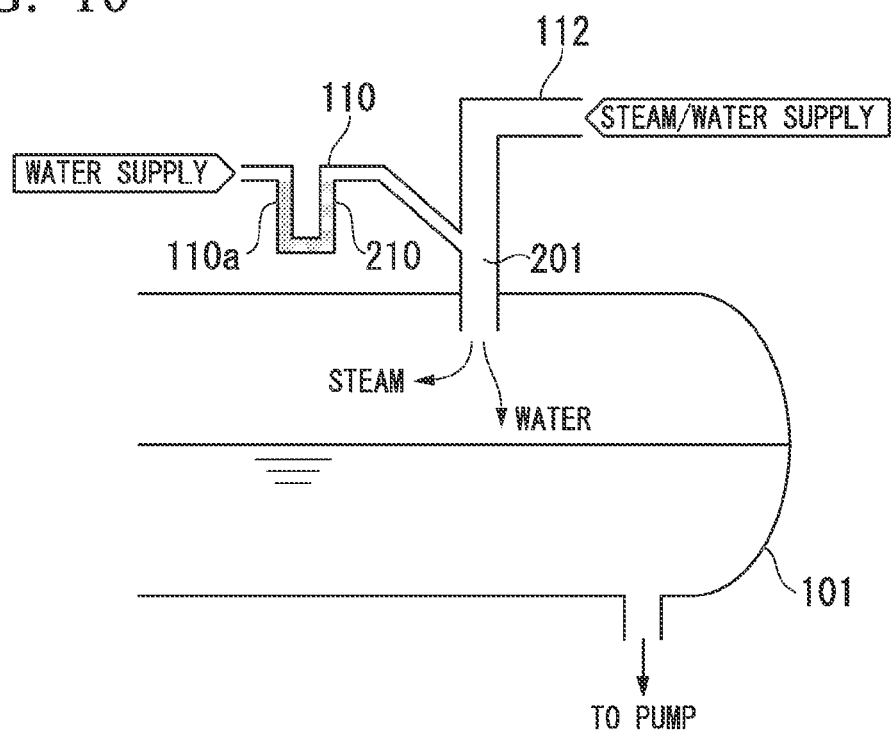
FIG. 10 is a view which describes a converging portion of a return line with a feed line of a second modified example in the temperature control system shown in FIG. 7.

Next, at the converging portion of a second modified example shown in FIG. 10, the feed line 110 is coupled and converged with the return line 112 so as to give an acute angle with respect to a direction at which the two-phase fluid of the return line 112 flows. In the feed line 110 which is upstream from the converging portion 201, for example, an approximately U-letter shaped recess 110a is formed, and a water seal portion 210 in which water is allowed to remain and filled in the recess 110a is provided as a seal portion.

According to the above-described constitution, where the quantity of feed water WL3 is low, steam which is inside the return line 112 and going to flow reversely inside the feed line 110 will be stopped at the water seal portion 210. Therefore, it is possible to prevent hammering caused by steam inside the return line 112 which flows reversely into the feed line 110 to result in condensation.

In place of the water seal portion 210, a check valve may be provided as a seal portion for preventing the reverse flow of steam.

THIRD MODIFIED EXAMPLE

Figure 11:
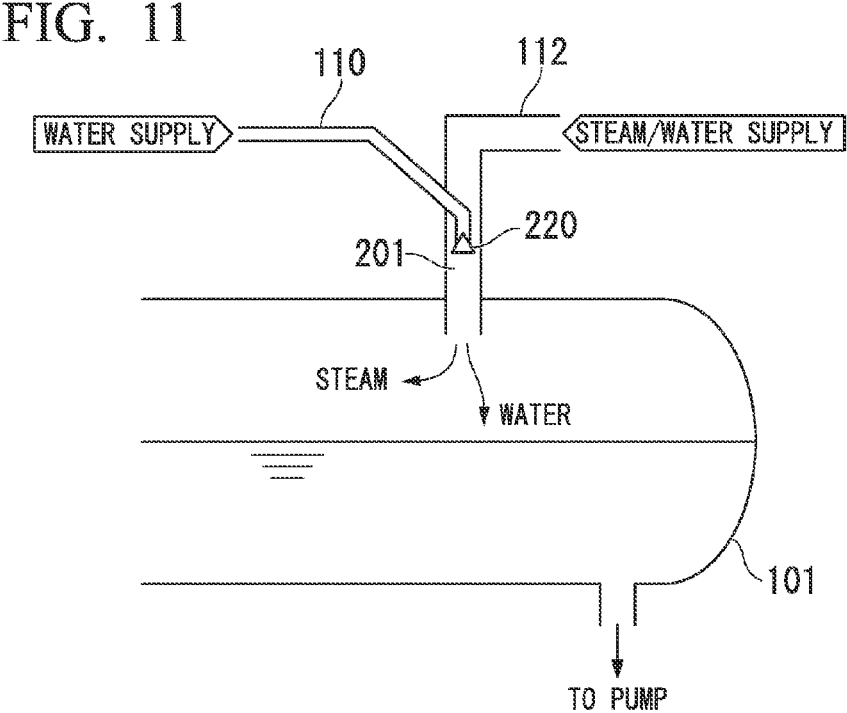
FIG. 11 is a view which describes a converging portion of a return line with a feed line of a third modified example in the temperature control system shown in FIG. 7.

FIG. 11 shows a constitution of the converging portion 201 in a third modified example. In FIG. 11, the feed line 110 is coupled to the return line 112 so as to give an acute angle with respect to a direction at which the two-phase fluid of the return line 112 flows. In addition, a spray nozzle 220 for dispersing and spraying feed water inside the return line 112 is formed at the leading end of the feed line 110. Thereby, the feed water which is converged with steam and water in the return line 112 is sprayed by the spray nozzle 220 over a wider range, by which abrupt condensation of steam can be suppressed to prevent hammering.

The temperature control system 200 of the present embodiment may be constituted by freely combining two or three of the above-described first to the third modified examples.

Verification Test of the Second Embodiment

Next, a description will be given of a verification test of the temperature control system 200 which is an embodiment of the present invention.

First, in FIG. 8, a temperature inside the coolant drum 101, a water temperature t1 of each of the quantity of water WL4 supplied through the delivery line 113 and the quantity of water WL2 produced in the reactor 30, and a temperature t1 of each of the flow rate of steam WV1 and WV2 are all given as a saturated temperature of 195° C. Then, a water temperature t3 of quantity of feed water WL3 is given as 110° C.

Further, the following conditions are set:

Quantity of reaction heat Q=8000000 kcal/h (determined value (by calculation)),

Evaporative latent heat of water r=470 kcal/kg (properties (constant value)),

Specific heat of water Cp=1 kcal/kg/° C. (properties (constant value)),

Pressure of steam drum=1.3 MPaG, and

Recycle quantity of pump 104 WL4=68000 kg/h.

Under the above conditions, in the control device 206 of the temperature control system 200, the above-described formula (9) is used to make uniform a temperature inside the coolant drum 101 and also make the liquid level constant, thereby deciding the quantity of feed water WL3 which is equal to the flow rate of steam WV1 outside a system. That is, the above-described individual values are substituted for the formula (9) to obtain the following formula.

$$WL3=Q/\{Cp\times(t1-t3)+r\}=14400 \text{ kg/h.}$$

Further, since the flow rate of steam WV1 is equal to the quantity of feed water WL3 by referring to the formula (4), the following formula is obtained:

$$WV1=WL3=14400 \text{ kg/h}$$

Still further, when the formula (8) is used to obtain a quantity of steam production WV2 inside the reactor 30, the following formula is obtained:

$$WV2=Q/r=17000 \text{ kg/h.}$$

In addition, the formula (5) is used to obtain the flow rate of water WL2 at the outlet of the reactor 30, the following formula is obtained.

$$WL2=WL4-WV2=51000 \text{ kg/h.}$$

Figure 12:
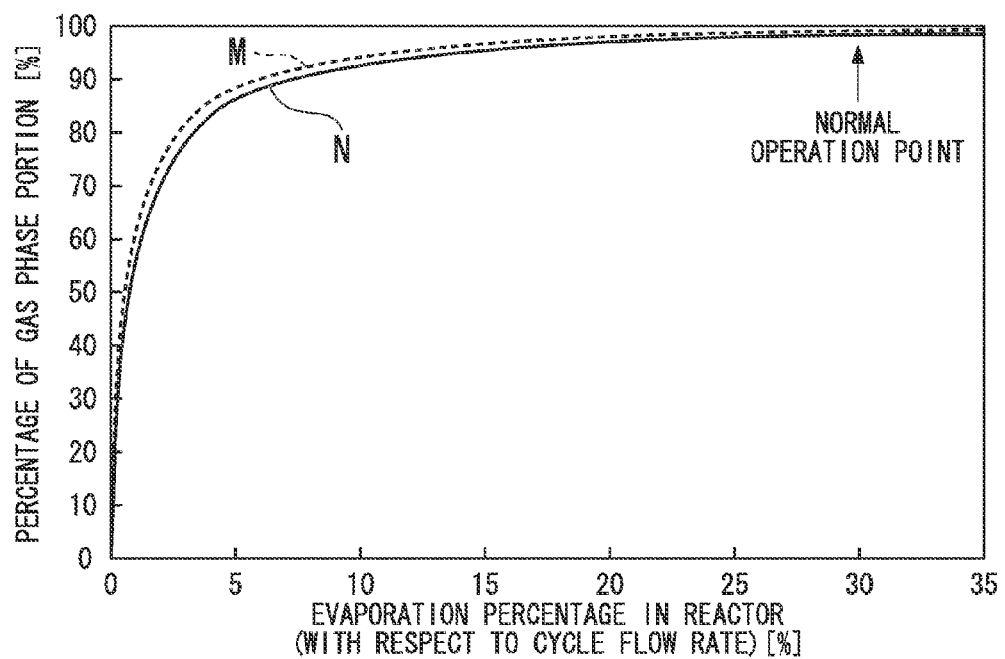
FIG. 12 is a graph which shows a change in percentage of steam at an outlet of a slurry bubble column reactor in the temperature control system shown in FIG. 7 and a change thereof on the return line after being converged.

Next, FIG. 12 is a graph of the verification test which shows changes in steam percentages at positions before and after the converging portion 201 of the return line 112 with the feed line 110 in the temperature control system 200.

In FIG. 12, a percentage of the steam WV2 produced inside the reactor 30 to the recycle quantity of water WL4 supplied from a steam vessel 2 to the reactor 30 (WV2/WL4) is taken on the horizontal axis. A percentage of quantities of steam in the two-phase fluid inside the return line 112 before and after the converging portion 201 is taken on the longitudinal axis as a percentage of the gas phase portion.

Then, a determination is made for a percentage of quantities of steam (gas phase portion) in the two-phase liquid before and after the converging portion 201 in the return line 112, where the percentage of the steam WV2 produced inside the reactor 30 to the recycle quantity of water WL4 (WV2/WL4) is changed.

In FIG. 12, the dotted line M indicates a change in percentage (WV2/(WL2+WV2)) of gas phase (steam) at the outlet of the reactor 30 (the return line 112), and the solid line N indicates a change in percentage of gas phase (steam) in the return line 112 (WV1/(WV1+WL4)) with which the feed line 110 has been thereafter converged.

In the graph shown in FIG. 12, at the start point, an evaporation percentage of the reactor 30 is zero (WV2/WL4=0). However, the steam WV2 is produced in an increased quantity with a rise in temperature inside the reactor 30. The percentage of the evaporation quantity WV2 to the recycle flow rate WL4 in the reactor 30 (WV 2/WL4) is normally at 30% during operation. This is referred to as a normal operation point. In this state, a percentage of quantity of steam WV2 produced at the outlet of the reactor 30 (WV2/WL4) is changed to a percentage of quantity of steam WV1 in the return line 112 into which the feed water WL3 has been thereafter converged (WV1/(WV1+WL4)), which is a reduction only by approximately 1%.

Further, even when a percentage of the evaporation quantity WV2 to the recycle flow rate WL4 in the reactor 30 (WV2/WL4) is changed across a range exceeding zero to 35% from a percentage of the quantity of steam indicated with the dotted line M (WV2/(WL2+WV2)) to a percentage of the quantity of steam indicated with the solid line N in the return line 112 after being converged (WV1/(WV1+WL4)), the change is within a range of approximately 1% to 3%, which is extremely low. Thus, no hammering has been caused.

Here, if the steam WV2 inside the return line 112 is entirely subjected to condensation at the converging portion 201 of the return line 112 with the feed line 110, hammering may take place. However, in the verification test, as described above, a percentage of the steam WV1 inside the return line 112 into which the quantity of feed water WL3 has been thereafter converged is changed in a range of approximately 1% to 3%. Therefore, the flow rate of steam WV1 is balanced with the quantity of feed water WL3, and no hammering will take place.

A technical scope of the present invention shall not be limited to the above-described embodiments and may be modified in various ways within a scope not departing from the gist of the present invention.

For example, in the above-described embodiment, a natural gas is used as a hydrocarbon feedstock which is supplied to the liquid fuel synthesizing system 1. However, the present invention shall not be limited thereto and, for example, other hydrocarbons feedstock such as asphalt and residual oils may be used.

Further, in the above-described embodiment, as a synthesis reaction in the reactor 30, there has been exemplified the synthesis of liquid hydrocarbons by the FT synthesis reaction, to which the present invention shall not be, however, limited. Synthesis reactions in the reactor 30 may include, for example, oxo synthesis (hydroformylation reaction) "R—CH=$CH_2$+CO+$H_2$→R—$CH_2CH_2$CHO," methanol synthesis "CO+$2H_2$→$CH_3$OH," and dimethyl ether (DME) synthesis "3CO+$3H_2$→$CH_3OCH_3$+$CO_2$."

Further, in the above-described embodiment, as shown in FIG. 1, a post-reaction fluid (reaction product) is discharged from the top 30b of the reactor 30. However, a position at which the post-reaction fluid is discharged from the reactor 30 may be changed, whenever necessary. For example, the post-reaction fluid may be discharged from the middle section 30c (side surface) or the bottom 30a of the reactor 30 or may be discharged from a plurality of sites among the top 30b, the middle section 30c and the bottom 30a of the reactor 30. A position at which the post-reaction fluid is discharged may be changed, for example, depending on types of exothermic reactions inside the reactor 30.

Further, in the above-described embodiment, water is employed as water but may not be necessarily water.

Further, in the above-described embodiment, a mixed phase fluid composed of steam partially evaporated at the lower heat transfer tube 32a and water is returned through the return line 112 to the coolant drum 101. The mixed phase fluid may not be returned to the coolant drum 101.

Further, in the above-described embodiment, each of the first temperature adjustment unit 121 and the second temperature adjustment unit 122 is provided with the coolant drum 101 and the pressure control unit 118, to which the present invention shall not be, however, limited. As long as the unit is constitutionally adjustable for temperature of water which is a liquid coolant, the unit may be changed in constitution, whenever necessary.

Still further, the above-described embodiment is provided with the two upper heat transfer tubes 32b, to which the present invention shall not be, however, limited.

In addition, in the above-described embodiment, an actual temperature inside the bottom 30a of the reactor 30 is set to be lower than an actual temperature inside each of the middle section 30c and the top 30b which are positioned further above from the bottom 30a in the reactor 30, to which the present invention shall not be, however, limited. The actual temperature inside the bottom 30a may be equal to the actual temperature inside each of the middle section 30c and the top 30b.

In a scope not departing from the gist of the present invention, structural elements of the above-described embodiment may be changed to any known structural elements, whenever necessary, and the above-described modified examples may be appropriately combined.

INDUSTRIAL APPLICABILITY

The present invention relates to a temperature control system which recovers reaction heat inside an FT synthesis reactor to control a temperature inside the reactor. According to the present invention, it is possible to control a temperature inside the reactor with high accuracy.

DESCRIPTION OF REFERENCE NUMERALS

1: Liquid fuel synthesizing system (hydrocarbon synthesis reaction system)
3: Synthesis gas production unit
5: FT synthesis unit (hydrocarbon synthesis reaction apparatus)
7: Upgrading unit
30: Slurry bubble column reactor (reactor)
30a: Bottom
32a: Lower heat transfer tube (lower heat removing unit)
32b: Upper heat transfer tube (upper heat removing unit)
100: Temperature control system
101: Coolant drum
106: Reaction heat temperature determination unit
110: Feed line
111: Steam outlet line
112: Return line
114: Feed-water inner line (coolant feeding unit)
115: Hole (through hole)
118: Pressure control unit
121: First temperature adjustment unit
122: Second temperature adjustment unit
201: Converging portion
206: Control device
210: Seal portion
220: Spray nozzle

The invention claimed is:

1. A temperature control system for controlling a temperature inside a reactor in which an exothermic reaction takes place by recovering reaction heat in the reactor, the temperature control system comprising:
  a lower heat removing unit which is disposed at the bottom of the reactor and through which a liquid coolant is flowed; and
  an upper heat removing unit which is disposed in the reactor further above from the lower heat removing unit and through which the liquid coolant is flowed, wherein
  the lower heat removing unit is supplied with the liquid coolant which is adjusted for temperature by a first temperature adjustment unit, and
  the upper heat removing unit is supplied with the liquid coolant which is adjusted for temperature by a second temperature adjustment unit different from the first temperature adjustment unit, wherein the system further comprises:
  a reaction heat temperature determination unit which determines a temperature inside the bottom of the reactor, wherein the first temperature adjustment unit is controlled on the basis of a determination result of the reaction heat temperature determination unit, and wherein the first temperature adjustment unit is provided with a coolant drum in which a liquid coolant is accommodated in a gas-liquid equilibrium state;
  a pressure control unit which controls a pressure inside the coolant drum,
  wherein the pressure control unit controls the pressure inside the coolant drum on the basis of deviation of an actual temperature inside the bottom of the reactor determined by the reaction heat temperature determination unit from a temperature set value inside the bottom, thereby controlling a temperature of the liquid coolant inside the coolant drum,
  and wherein the coolant drum is provided with a coolant feeding unit which feeds a liquid coolant thereinto,
  the coolant feeding unit is disposed inside a gas phase portion of the coolant drum, and
  a dispersing unit which disperses a liquid coolant to the gas phase portion is formed at the coolant feeding unit.

2. The temperature control system according to claim 1, wherein
  the coolant feeding unit is formed in a tubular shape, and
  the dispersing unit is constituted with a through hole formed on the coolant feeding unit.

3. A hydrocarbon synthesis reaction apparatus in which a synthesis gas containing a hydrogen gas and a carbon monoxide gas as main components is brought into contact with a slurry prepared by suspending catalyst particles inside a liquid medium to synthesize hydrocarbon compounds, the hydrocarbon synthesis reaction apparatus comprising:
  a reactor which accommodates the slurry and to which the synthesis gas is supplied; and
  the temperature control system described in claim 1.

4. A hydrocarbon synthesis reaction system comprising:
  the hydrocarbon synthesis reaction apparatus described in claim 3;

a synthesis gas production unit which reforms a hydrocarbon feedstock to produce the synthesis gas and supplies the synthesis gas to the reactor; and an upgrading unit which produces liquid fuels from the hydrocarbon compounds.

5. A temperature control system for controlling a temperature inside a reactor in which an exothermic reaction takes place by recovering reaction heat in the reactor, the temperature control system comprising:

a lower heat removing unit which is disposed at the bottom of the reactor and through which a liquid coolant is flowed; and an upper heat removing unit which is disposed in the reactor further above from the lower heat removing unit and through which the liquid coolant is flowed, wherein the lower heat removing unit is supplied with the liquid coolant which is adjusted for temperature by a first temperature adjustment unit, and the upper heat removing unit is supplied with the liquid coolant which is adjusted for temperature by a second temperature adjustment unit different from the first temperature adjustment unit, wherein the system further comprises:

a reaction heat temperature determination unit which determines a temperature inside the bottom of the reactor, wherein the first temperature adjustment unit is controlled on the basis of a determination result of the reaction heat temperature determination unit, and wherein the first temperature adjustment unit is provided with a coolant drum in which a liquid coolant is accommodated in a gas-liquid equilibrium state and a pressure control unit which controls a pressure inside the coolant drum, and the pressure control unit controls the pressure inside the coolant drum on the basis of deviation of an actual temperature inside the bottom of the reactor determined by the reaction heat temperature determination unit from a temperature set value inside the bottom, thereby controlling a temperature of the liquid coolant inside the coolant drum, and further comprising:

a return line which returns a mixed phase fluid containing steam generated at the lower heat removing unit and a liquid coolant to the coolant drum;

a steam outlet line which discharges steam inside the coolant drum to outside a system; and a feed line which supplies feed water composed of a liquid coolant to the return line in a quantity of feed water matching a quantity of steam discharged outside the system.

6. The temperature control system according to claim 5, further comprising:

a control device which decides the quantity of feed water on the basis of the relationship between a quantity of reaction heat inside the reactor and a difference between a relatively high temperature inside the coolant drum and a relatively low temperature of the feed water; and a water-supply adjustment device which sets the quantity of feed water to be supplied from the feed line to the return line depending on the quantity of feed water decided by the control device.

7. The temperature control system according to claim 6, wherein the quantity of feed water decided by the control device is computed by the following formula:

$$WL3=Q/\{Cp\times(t1-t3)+r\}, \text{ wherein}$$

WL3 is a quantity of feed water,

Q is a quantity of reaction heat inside the bottom of the reactor,

Cp is a specific heat of liquid coolant, t1 is a temperature inside the coolant drum or inside the bottom of the reactor, t3 is a temperature of feed water, and r is an evaporative latent heat of liquid coolant.

8. The temperature control system according to claim 5, wherein at a converging portion of the return line with the feed line, the feed line is connected to the return line at an acute angle along a direction at which a mixed phase fluid moves forward inside the return line.

9. The temperature control system according to claim 5, wherein the feed line is provided with a seal portion which prevents reverse flow of steam.

10. The temperature control system according to claim 5, wherein at a converging portion of the return line with the feed line, a spray nozzle which sprays feed water into the return line is installed on the feed line.

11. A hydrocarbon synthesis reaction apparatus in which a synthesis gas containing a hydrogen gas and a carbon monoxide gas as main components is brought into contact with a slurry prepared by suspending catalyst particles inside a liquid medium to synthesize hydrocarbon compounds, the hydrocarbon synthesis reaction apparatus comprising:

a reactor which accommodates the slurry and to which the synthesis gas is supplied; and the temperature control system described in claim 5.

12. A hydrocarbon synthesis reaction system comprising:

the hydrocarbon synthesis reaction apparatus described in claim 11;

a synthesis gas production unit which reforms a hydrocarbon feedstock to produce the synthesis gas and supplies the synthesis gas to the reactor; and an upgrading unit which produces liquid fuels from the hydrocarbon compounds.

* * * * *